(12) United States Patent
Hiroya et al.

(10) Patent No.: US 8,968,499 B2
(45) Date of Patent: Mar. 3, 2015

(54) OPTICAL SHEET LAMINATING METHOD, OPTICAL SHEET LAMINATING DEVICE AND PROGRAM USED THEREWITH, AND DISPLAY DEVICE

(75) Inventors: Tsutomu Hiroya, Kanagawa (JP); Koji Shigemura, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 409 days.

(21) Appl. No.: 13/104,607

(22) Filed: May 10, 2011

(65) Prior Publication Data
US 2012/0003434 A1   Jan. 5, 2012

(30) Foreign Application Priority Data
Jun. 30, 2010   (JP) .................................. 2010-150067

(51) Int. Cl.
*B32B 41/00* (2006.01)
*G02B 3/00* (2006.01)
*B32B 38/18* (2006.01)

(52) U.S. Cl.
CPC ............ *G02B 3/005* (2013.01); *B32B 38/1841* (2013.01); *B32B 41/00* (2013.01); *B32B 2041/04* (2013.01); *B32B 2307/40* (2013.01); *B32B 2457/20* (2013.01); *G02B 3/0012* (2013.01)
USPC ............. 156/64; 156/358; 156/363; 156/378; 156/379

(58) Field of Classification Search
CPC ................... B32B 2457/202; B32B 2457/20; B32B 37/12; B32B 41/00; B32B 2041/04; B32B 37/185; B32B 38/1833; G02F 2001/133354; G02F 1/133526; H01L 21/68; H01L 2224/75753; G02B 7/02
USPC ............................ 156/64, 358, 363, 378, 379
See application file for complete search history.

(56) References Cited

U.S. PATENT DOCUMENTS

| | | | |
|---|---|---|---|
| 6,346,158 B1 * | 2/2002 | Colgan et al. ................. | 156/64 |
| 6,992,693 B2 | 1/2006 | Tajika et al. | |
| 7,420,322 B2 | 9/2008 | Takei et al. | |
| 7,589,898 B2 | 9/2009 | Shigemura et al. | |
| 7,834,944 B2 | 11/2010 | Otte et al. | |
| 7,849,899 B2 | 12/2010 | Yamamoto et al. | |

(Continued)

FOREIGN PATENT DOCUMENTS

| | | |
|---|---|---|
| CN | 1577414 | 2/2005 |
| CN | 101144865 | 3/2008 |

(Continued)

OTHER PUBLICATIONS

Japanese Official Action—2010-150067—Apr. 30, 2014.

(Continued)

*Primary Examiner* — Michael N Orlando
*Assistant Examiner* — Joshel Rivera
(74) *Attorney, Agent, or Firm* — Young & Thompson

(57) ABSTRACT

To provide a laminating method which achieve high accuracy and high quality in a laminating step of an optical sheet and a display panel. Contact areas between the optical sheet and the sheet holding head are read. At this time, an optical element face of the optical sheet is brought into contact with the sheet holding head, light is irradiated to the contact areas therebetween from a no-optical-element face, and positional information of the optical sheet is read based on the distribution of the reflected light thereof.

20 Claims, 23 Drawing Sheets

(56) References Cited

U.S. PATENT DOCUMENTS

| | | | |
|---|---|---|---|
| 8,416,352 B2 | 4/2013 | Mori | |
| 8,421,934 B2 | 4/2013 | Otte et al. | |
| 8,482,856 B2 | 7/2013 | Hiroya et al. | |
| 2009/0231715 A1 * | 9/2009 | Hiroya et al. | 359/619 |
| 2010/0142856 A1 | 6/2010 | Takeuchi et al. | |

FOREIGN PATENT DOCUMENTS

| | | |
|---|---|---|
| CN | 101533113 | 9/2009 |
| CN | 101681025 | 3/2010 |
| CN | 101751570 | 6/2010 |
| DE | 10252830 | 5/2004 |
| JP | 07-294902 | 11/1995 |
| JP | 09-005020 | 1/1997 |
| JP | 10-300933 | 11/1998 |
| JP | 2003-084230 | 3/2003 |
| JP | 2007-187960 | 7/2007 |
| JP | 2008-070760 | 3/2008 |
| JP | 2008-152130 | 7/2008 |
| JP | 2009-208231 | 9/2009 |
| JP | 2009-222903 | 10/2009 |
| JP | 2009-223193 | 10/2009 |
| JP | 2009-300816 | 12/2009 |
| JP | 2010-008811 | 1/2010 |
| JP | 2013/129235 | 9/2013 |
| KR | 2010-0087452 | 8/2010 |

OTHER PUBLICATIONS

Chinese Official Action—201110182259.9—Apr. 24, 2014.

* cited by examiner

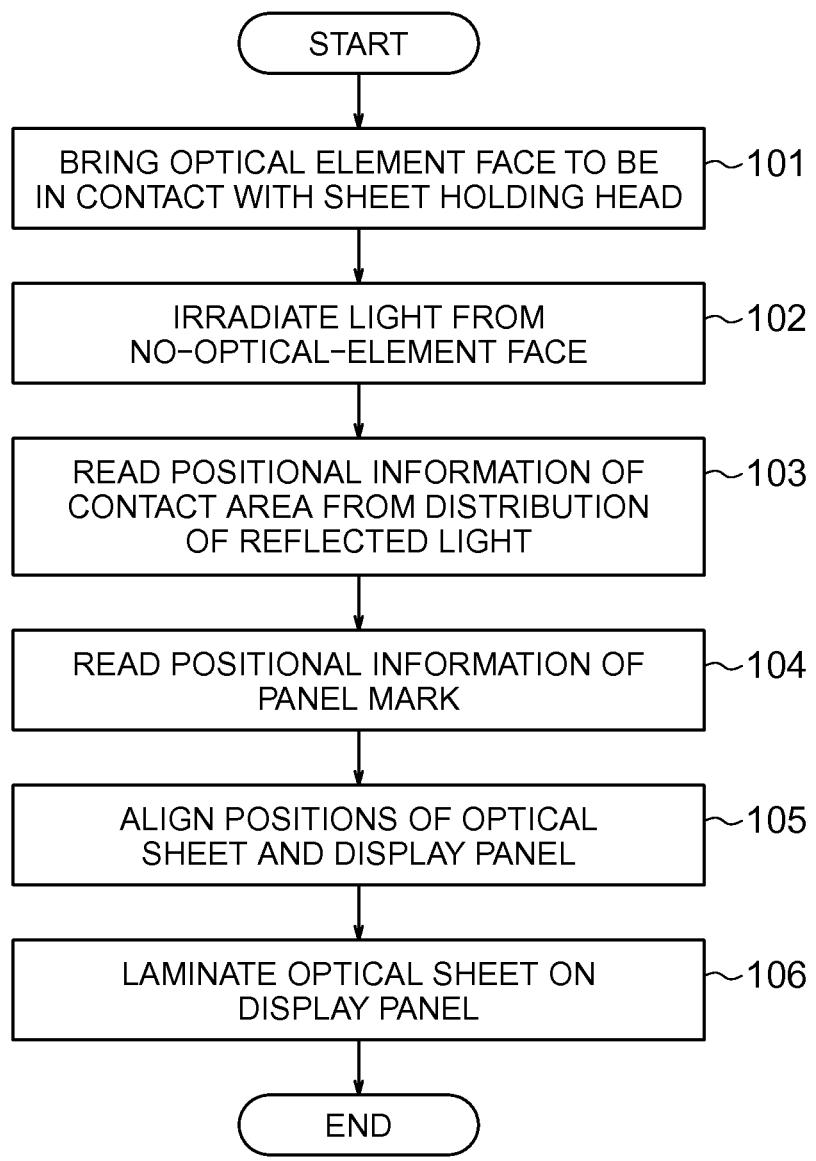

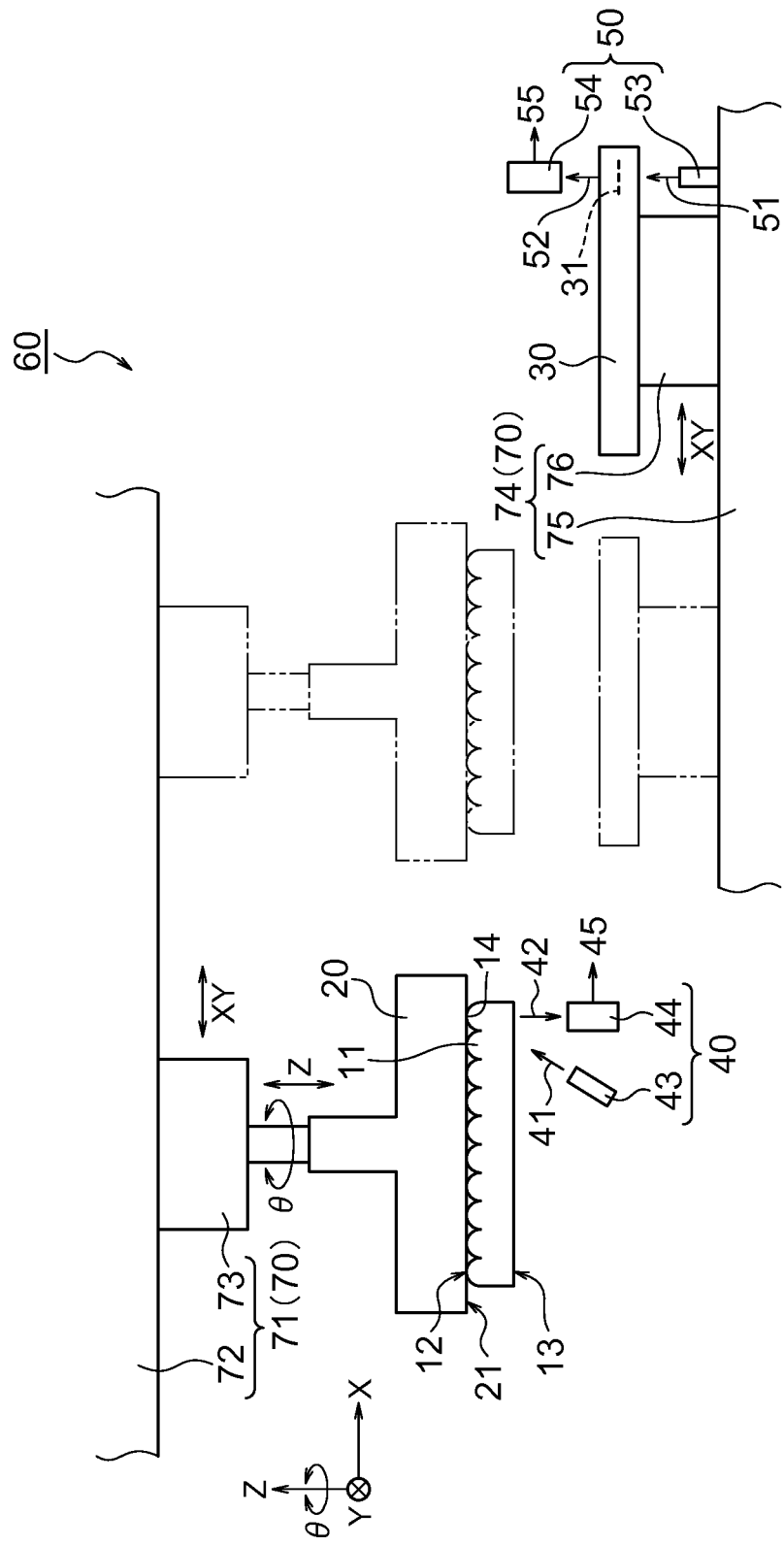

OPTICAL SHEET LAMINATING METHOD, OPTICAL SHEET LAMINATING DEVICE AND PROGRAM USED THEREWITH, AND DISPLAY DEVICE

CROSS-REFERENCE TO RELATED APPLICATION

This application is based upon and claims the benefit of priority from Japanese patent application No. 2010-150067, filed on Jun. 30, 2010, the disclosure of which is incorporated herein in its entirety by reference.

BACKGROUND OF THE INVENTION

1. Field of the Invention

The present invention relates to an optical sheet laminating method, an optical sheet laminating device, a display device, and the like for laminating an optical sheet on a display panel.

2. Description of the Related Art

In accordance with demands for highly sophisticated functions of recent display devices, a unique display device capable of stereoscopic images, viewing angle controls, and the like through laminating an optical sheet such as a lenticular lens sheet, a prism sheet, or a diffusion sheet on a display panel that uses electro-optical elements such as liquid crystal has come to be used.

As an example of such display device, a display device using a lenticular lens sheet will be described. FIG. 21A is a perspective view showing a lenticular lens sheet, and FIG. 21B is a schematic view showing a stereoscopic display device using the lenticular lens sheet.

As shown in FIG. 21A, a lenticular lens sheet 110 has a flat face on one of the surfaces, and a plurality of cylindrical lenses 111 each having columnar surface and a semicircular (roughly a segment shape) cross-sectional shape are repeatedly provided in parallel on the other surface.

As shown in FIG. 21B, a left-eye pixel 115a and a right-eye pixel 115b are disposed alternately on a display panel 114 by corresponding to focal points of each of the cylindrical lenses 111. When the left-eye pixels 115a and the right-eye pixels 115b are driven by a drive circuit, not shown, according to prescribed signals, a left-eye image is formed in a left-eye region 120a and a right-eye image is formed in a right-eye region 120b, respectively, by the cylindrical lenses 111, so that an observer can recognize a stereoscopic image. It is needless to mention that a normal two-dimensional image can also be displayed through driving the left-eye pixels 115a and the right-eye pixels 115b by a same signal.

Further, as a display device using a lenticular lens sheet, there is a plural-image simultaneous display device which displays a plurality of images simultaneously. This uses the same method as that of the stereoscopic display, with which different images can be displayed to a plurality of observers by distributing images to the observing directions by the cylindrical lenses.

For such display devices using a micro lens array and a lenticular lens sheet, it is required to mount the lenticular lens sheet and the like on the display panel with high accuracy in order to acquire a high-quality stereoscopic image display or a plural-image simultaneous display. Particularly, for a high-definition display device loaded to a recent terminal device and the like, it is required to achieve lamination with accuracy of higher than ever before, which is lamination accuracy in an order of μm.

In order to laminate the optical sheet such as a lenticular lens sheet on the display panel with high accuracy, it is necessary to provide position alignment marks on each of the optical sheet and the display panel, and laminate those through executing an alignment action by reading those marks. This technique will be referred to as "related technique 1" hereinafter.

In the related technique 1, it is necessary to form each marks on the optical sheet and the display panel in an order of μm for achieving the lamination accuracy in an order of μm. For example, the distance of the mark on the lenticular lens sheet from the vertex of the cylindrical lens is required to be accurate in an order of μm. However, in general, it is difficult to form the mark accurately in an order of μm at the time of manufacturing the optical sheet with a machine work. In the meantime, another lens mark reading method is disclosed in Japanese Unexamined Patent Publication 2009-223193 (Patent Document 1: see FIG. 3 and FIG. 8). Hereinafter, this technique is referred to as "related technique 2". In the related technique 2, no special mark is formed on a lenticular lens sheet, but light is irradiated onto the lenticular lens sheet and positional information of the cylindrical lenses is read from a transmission light luminance distribution generated according to a lens image forming performance. For the display panel, panel marks are captured via the cylindrical lenses, and the positions are aligned based thereupon.

Further, Japanese Unexamined Patent Publication 2009-222903 (Patent Document 2: see FIG. 39) discloses steps for laminating an optical element array sheet on a display panel by using a curved-type optical element holding head.

However, there are followings issues with the related technique 1. An optical sheet mark is placed on the surface of the optical sheet, and a panel mark is placed on the surface of the display panel. For example, in a case where the marks on both are superimposed with each other, an image thereof is captured by a camera, and each mark is read from the image, it is difficult to align the focal point simultaneously with both marks since the distances to both marks from the camera are different. This causes a problem in reading the marks.

Referring to a case of a liquid crystal display device as a way of example, as shown in FIG. 22A, a panel mark 132 is formed on a drive substrate 152 or a counter substrate 153, and an optical sheet mark 150 is formed on an optical sheet 151. Therefore, it is necessary to align the focal point separately with the optical sheet mark 150 and the panel mark 132 when capturing the images thereof by a same camera since there are the counter substrate 153, a polarization plate 154, and the optical sheet 151 existing therebetween. That is, the reading accuracy of both marks depends on the feeding accuracy of the focal point direction of the camera. Further, since it takes more time for aligning the focal point, it is disadvantageous in terms of tactics. Further, because of the structure to read the panel mark 132 via the optical sheet 151, the position of the panel mark 132 is observed by being changed due to a refractive effect of the optical sheet 151. Therefore, it is necessary to perform correction thereof. Further, the luminance distribution of transmission light acquired by irradiating light onto the optical sheet 151 largely depends on the image forming performance of the cylindrical lens. However, in a case where variations in the radius curvatures of each of the lenses are great or in a case where there is distortion generated in the optical sheet 151 itself, for example, the luminance distribution changes nonuniformly within the surface. This leads to deterioration of the mark reading accuracy.

In addition, for superimposing the optical sheet mark 150 with the panel mark 132 on one another, the panel mark 132 is disposed directly under the optical sheet 151. For example, with the liquid crystal display device, as shown in FIG. 22B, the external shape of the optical sheet 151 is smaller than the external shape of the display panel 131 and the external shape of the polarization plate 154 by one size. Thus, "the panel mark 132 comes directly under the optical sheet 151" means that the panel mark 132 is disposed near a display region 155 of the display panel 131. With a normally-white liquid crystal display device in particular, the panel mark 132 which causes leak of light (shield of light) is formed near the display region 155. Thus, there is a great influence imposed upon the display quality.

In addition to those issues of the related technique 1, a new issue has been found as a result of studies done by the inventors of the present invention regarding steps for laminating a highly accurate and highly reliable lens and a display panel. For example, with a lenticular lens sheet as one of the optical lens sheets, there may be a case where the lens pitch becomes nonuniform within the surface as shown in FIG. 23 mainly due to the manufacture process of the lenticular lens sheet. For example, there are various patterns of cases where the lens pitch becomes nonuniform, e.g., a case where the lens pitch becomes larger towards the upper side as in FIG. 23A, a case where the lens pitch becomes larger towards the center as in FIG. 23B, and a case where the lens pitch becomes smaller towards the center as in FIG. 23C. Such nonuniformity of the lens pitch greatly affects the visually recognizable distance where the stereoscopic viewing field becomes the maximum and the size itself of the stereoscopic viewing field in a stereoscopic display device. Therefore, it is necessary to ease the influence of the lens pitch fluctuation when laminating the optical sheet.

Further, when holding an optical element forming surface of the optical sheet by using a sheet holding head, the substantial contact area between the optical sheet and the sheet holding head becomes small since the optical element forming surface has fine protrusions and concaves. For this reason, there is such an issue that the force for holding the optical sheet is reduced.

In the meantime, while the related technique 1 reads the positional information of the optical sheet mark by using existence of light transmitting through the optical sheet, the related technique 2 reads the positional information of the lens by using the luminance distribution of light transmitting through the optical sheet. That is, the related technique 2 acquires the positional information by using the light transmitting through the optical sheet as in the case of the related technique 1, so that it faces the same issues. Further, the sheet holding head (a holding frame that holds the lenticular lens sheet) of the related technique 2 is formed with a material that exhibits light transmitting property for not disturbing imaging done by an imaging part (see paragraph 0022 of Patent Document 2). Therefore, the materials used for the sheet holding head of the related technique 2 are limited to fragile glass, plastics, and the like, so that solid metals, ceramics, and the like cannot be used.

The present invention is designed to overcome such issues. An exemplary object of the present invention is to provide an optical sheet laminating method and a laminating device using the method which can mount an optical sheet on a display panel with high yield and high accuracy as well as to provide a high-quality display device manufactured by using the laminating method.

SUMMARY OF THE INVENTION

The optical sheet laminating method according to an exemplary aspect of the invention is a method which laminates an optical sheet having two sides constituted with an optical element face where a plurality of optical elements are formed and a no-optical-element face where the optical elements are not formed with a display panel by using a sheet holding head, and the method is characterized to include: bringing either the optical element face or the no-optical-element face to be in contact with the sheet holding head; irradiating light to contact areas between either the optical element face or the non-optical and the sheet holding head from the other one of the optical element face and the no-optical-element face; reading positional information of the contact areas from a distribution of reflected light thereof; and aligning positions of the optical sheet and the display panel based on the positional information of the contact areas, and laminating the optical sheet and the display panel.

The optical sheet laminating device according to another exemplary aspect of the invention is a device which laminates an optical sheet having two sides constituted with an optical element face where a plurality of optical elements are formed and a no-optical-element face where the optical elements are not formed with a display panel, and the device is characterized to include: a sheet holding head which holds the optical sheet by making contact with either the optical element face or the no-optical-element face; a first imaging part which irradiates light to contact areas between either the optical element face or the non-optical and the sheet holding head from the other one of the optical element face or the no-optical-element face, and acquires an image of reflected light thereof; a second imaging part which acquires an image of a panel mark added to the display panel; a moving mechanism unit which moves at least either the optical sheet or the display panel in a coordinate space; and a control unit which reads positional information of the contact areas from the image acquired by the first imaging part and positional information of the panel mark from the image acquired by the second imaging part and controls the moving mechanism unit based on the positional information of the contact areas and the positional information of the panel mark to align the positions of the optical sheet and the display panel and to laminate the optical sheet and the display panel.

The display device according to still another exemplary aspect of the invention is characterized to include the display panel to which the optical sheet is laminated by the optical sheet laminating method of the present invention.

BRIEF DESCRIPTION OF THE DRAWINGS

FIG. 2 is a chart showing steps of the laminating method according to the first exemplary embodiment;

FIG. 3 is a schematic illustration showing a laminating device according to the first exemplary embodiment;

FIGS. 8A-8C show another example of the first exemplary embodiment, in which FIG. 8A is a schematic illustration when reading the positional information of the optical sheet by a plurality of cameras, FIG. 8B is a schematic illustration showing the sheet holding head when laminating the optical sheet, and FIG. 8C is a schematic illustration showing a case where the sheet holding head is provided on the lower side of the display panel;

FIGS. 9A-9C show a sheet holding head according to a second exemplary embodiment, in which FIG. 9A is a perspective view, and FIG. 9B and FIG. 9C are schematic illustrations showing a positional information reading action;

FIGS. 11A and 11B show perspective views of a part of the laminating step according to the second exemplary embodiment, in which FIG. 11A is a case where the contact areas between the sheet holding head and the optical sheet are in parallel to the arc tangent direction of the sheet holding head, and FIG. 11B is a case where the contact areas between the sheet holding head and the optical sheet are orthogonal to the arc tangent direction of the sheet holding head;

FIGS. 23A-23C show cases where the lens pitches become nonuniform within a surface of a lenticular lens sheet, in which FIG. 23A is a case where the lens pitch becomes larger towards the upper side, FIG. 23B is a case where the lens pitch becomes larger towards the center, and FIG. 23C is a case where the lens pitch becomes smaller towards the center.

DETAILED DESCRIPTIONS OF THE PREFERRED EMBODIMENTS

Figure 1A:
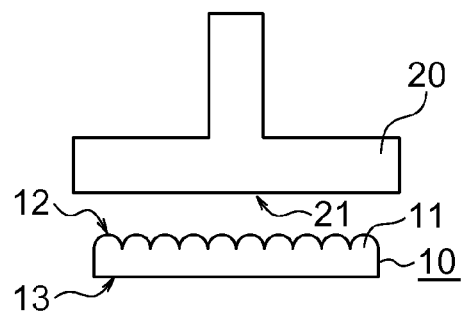
FIG. 1 shows schematic illustrations showing a laminating method according to a first exemplary embodiment.

Hereinafter, modes for embodying the present invention (referred to as "exemplary embodiments" hereinafter) will be described by referring to the accompanied drawings. In this Specification and the drawings, same reference numerals are applied to substantially the same structural elements.

First Exemplary Embodiment

In a first exemplary embodiment, a case of using a lenticular lens sheet formed with a plurality of cylindrical lenses as an optical sheet will be described. While explanations will be provided by referring to cases where the lenticular lens sheet is used as the optical sheet in other exemplary embodiments as well, the present invention is not limited only to that. An optical element array including a prism sheet with a prescribed pattern formed thereon, a reflection sheet, a diffusion sheet, and the like may also be used.

FIG. 1 is a schematic illustration showing a laminating method according to the first exemplary embodiment, and FIG. 2 is a chart showing steps of the laminating method according to the first exemplary embodiment. Hereinafter, explanations will be provided by referring to FIG. 1 and FIG. 2.

The optical sheet laminating method according to the first exemplary embodiment is for laminating an optical sheet 10 onto a display panel 30 by using a sheet holding head 20. The optical sheet 10 is a lenticular lens sheet formed with a plurality of cylindrical lenses 11 as a plurality of optical elements, and the optical sheet 10 includes an optical element face 12 where the cylindrical lenses 11 are formed, and a no-optical-element face 13 where the cylindrical lenses 11 are not formed. That is, the optical element face 12 is a concave-convex face, and the no-optical-element face 13 is a flat face. Further, the laminating method according to the first exemplary embodiment includes following steps.

Steps 101-103 (FIG. 1A and FIG. 1B): The optical element face 12 is brought into contact with the sheet holding head 20 (step 101), light 41 is irradiated from the no-optical-element face 13 to contact areas 14 between the optical element face 12 and the sheet holding head 20 (step 102), and the positional information of the contact areas 14 is read from the distribution of reflected light 42 thereof (step 103). In the steps 102 and 103, for example, a first imaging part 40 having a light source 43 and a camera 44 is used. The steps 101-103 may be executed in any orders as long as the positional information of the contact areas 14 can be read at last. For example, the steps 101-103 may be executed in this order or may all be executed simultaneously. Further, it is also possible to bring the no-optical-element face 13 to be in contact with the sheet holding head 20, irradiate the light 41 from the optical element face 12 to the contact areas between the no-optical-element face 13 and the sheet holding head 20, and read the positional information from the distribution of the reflected light 42.

Step 104 (FIG. 1C): Positional information of a panel mark 31 applied on the display panel 30 is read. In the step 104, for example, a second imaging part 50 having a light source 53 and a camera 54 is used. For example, the imaging part 50 irradiates light 51 to the panel mark 31 applied on the display panel 30, and the positional information of the panel mark 31 is read from transmission light 52 thereof. The step 104 may be executed before or after the steps 101-103 in terms of time. If the positional information of the panel mark 31 is already known, the step 104 may be omitted.

Step 105 (FIG. 1D): Positions of the optical sheet 10 and the display panel 30 are aligned based on the positional information of the contact areas 14 and the positional information of the panel mark 31. A typical alignment technique may be employed for this position alignment.

Step 106 (FIG. 1D): The optical sheet 10 and the display panel 30 are laminated. For example, the optical sheet 10 and the display panel 30 are laminated by relatively moving the optical sheet 10 and the display panel 30 while keeping the optical sheet 10 and the display panel 30 in contact. To relatively move the optical sheet 10 and the display panel 30 is to move at least one of the optical sheet 10 and the display panel 30. A typical laminating technique can be used for this lamination.

The first exemplary embodiment uses not the transmission light but the reflected light 42 for reading the positional information of the optical sheet 10. Therefore, the various issues of the case using the transmission light can be overcome in one effort, so that the reading accuracy of the positional information of the optical sheet 10 can be improved. This makes it possible to achieve high accuracy and to improve the yield in the optical sheet laminating step.

Figure 4A:
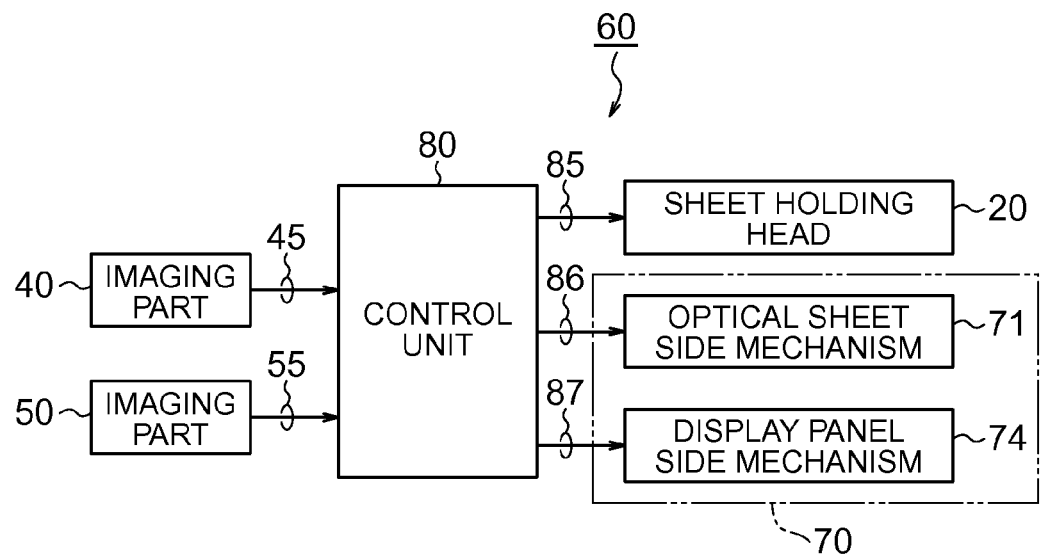
FIG. 4A is a block diagram showing the laminating device according to the first exemplary embodiment.
Figure 4B:
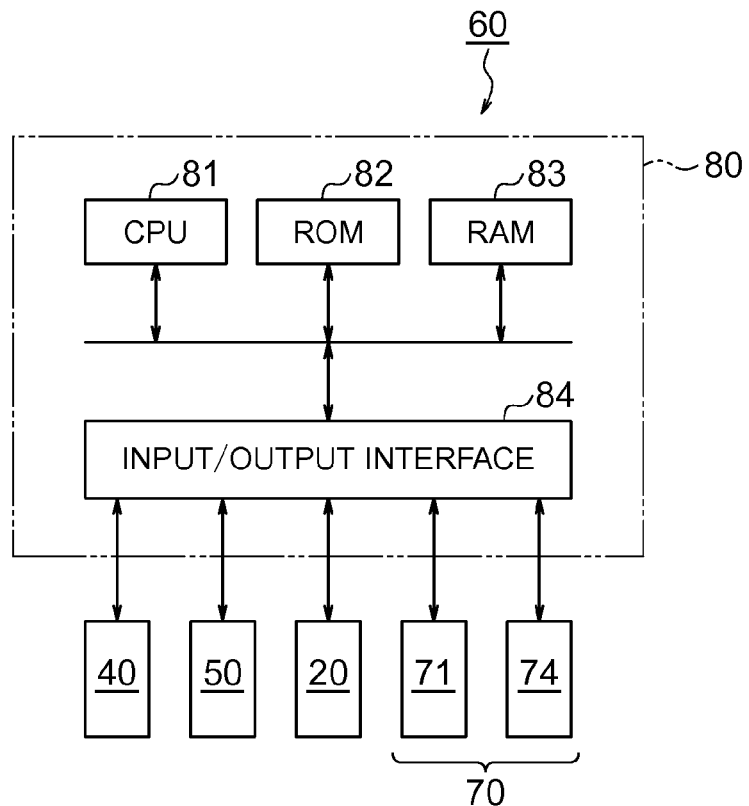
FIG. 4B is a block diagram showing an example of a control unit shown in FIG. 4A.
Figure 5:
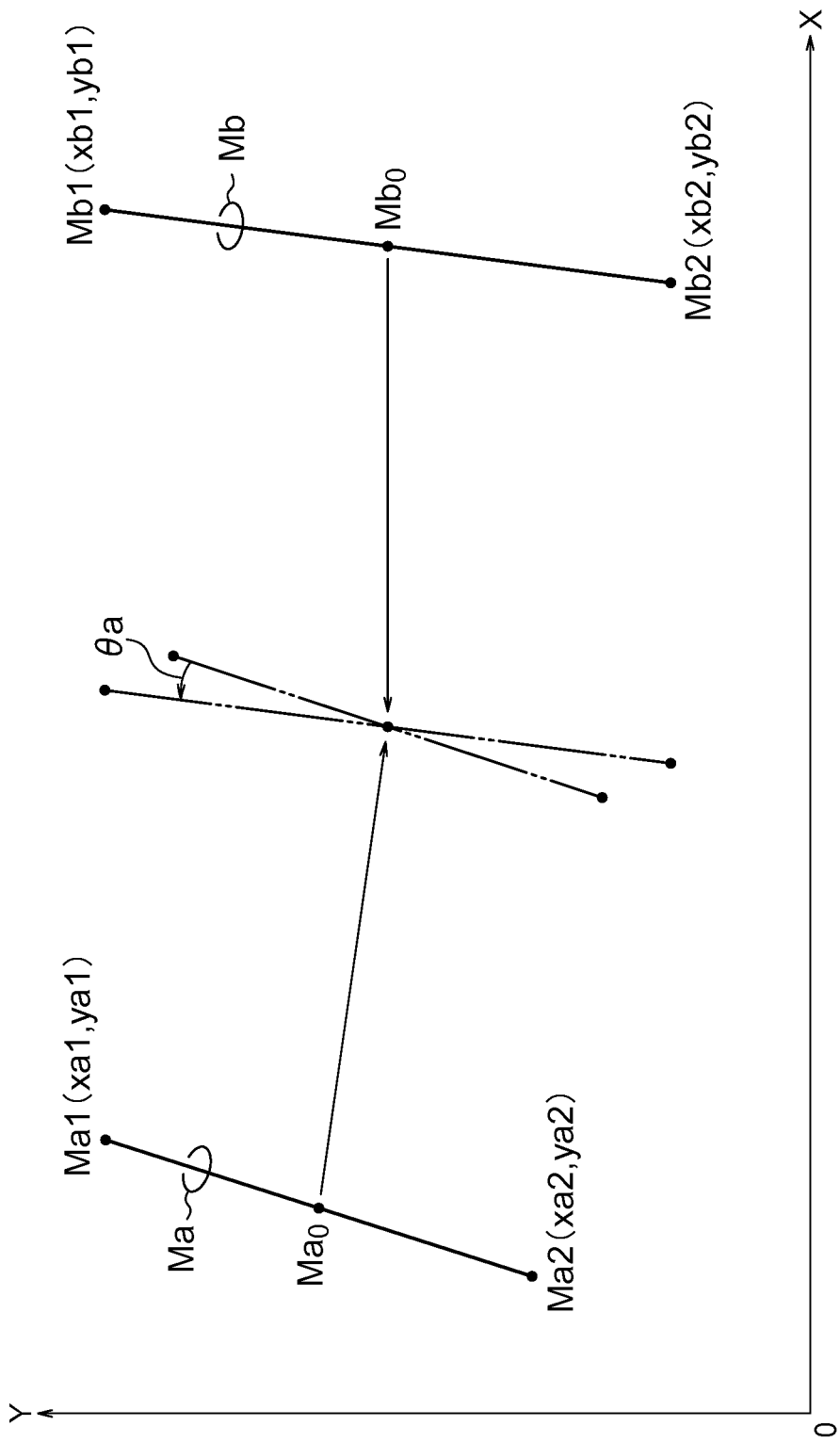
FIG. 5 is a graph showing an alignment action of the laminating device according to the first exemplary embodiment.

FIG. 3 is a schematic view showing a laminating device of the first exemplary embodiment. FIG. 4A is a block diagram showing the laminating device of the first exemplary embodiment. FIG. 4B is a block diagram showing an example of a control unit shown in FIG. 4A. FIG. 5 is a graph showing an example of an alignment action executed by the laminating device of the first exemplary embodiment. Hereinafter, explanations will be provided by referring to FIG. 3, FIG. 4, and FIG. 5.

An optical sheet laminating device 60 of the first exemplary embodiment is for laminating the optical sheet 10 on the display panel 30 by using the optical sheet laminating method according to the first exemplary embodiment, and the device 60 includes the sheet holding head 20, the first imaging part 40, the second imaging part 50, a moving mechanism unit 70, and a control unit 80. The sheet holding head 20 holds the optical sheet 10 by making contact with the optical element face 12. The imaging part 40 irradiates the light 41 from the no-optical-element face 13 to the contact areas 14 between the optical element face 12 and the sheet holding head 20, and acquires an image 45 of the distribution of the reflected light 42 thereof. The imaging part 50 acquires an image 55 of the panel mark 31 applied on the display panel 30. The moving mechanism unit 70 moves the optical sheet 10 and the display panel 30 in a coordinate space. The control unit 80 reads the positional information of the contact areas 14 from the image 45 acquired by the imaging part 40 as well as the positional information of the panel mark 31 from the image 55 acquired by the imaging part 50, controls the moving mechanism unit 70 based on the positional information of the contact areas 14 and the positional information of the panel mark 31 to align the positions of the optical sheet 10 and the display panel 30, and laminate the optical sheet 10 and the display panel 30.

The moving mechanism unit 70 includes an optical sheet side mechanism 71 and a display panel side mechanism 74. The optical sheet side mechanism 71 is formed with a linear motor mechanism (or a stepping motor and a screw feed mechanism), a rotary mechanism, and the like, for example. It is divided into a fixed main body 72 and a head stage 73 that is movable with respect to the main body 72. The head stage 73 is capable of linearly moving the sheet holding head 20 in the X-axis direction, the Y-axis direction, and Z-axis direction, respectively, and rotating in the θ direction about the Z-axis direction. The display panel side mechanism 74 is formed with a linear motor mechanism (or a stepping motor and a screw feed mechanism) and the like, for example, and it is divided into a fixed main body 75 and a panel stage 76 that is movable with respect to the main body 75. The panel stage 76 is capable of loading the display panel 30 thereon and linearly moving in the X-axis direction and the Y-axis direction, respectively. The head stage 73 and the panel stage 76 only need to move relatively. Thus, movements in the Z-axis direction and rotations in the θ direction may be allotted to the panel stage 76, and movements in the Y-axis direction may be allotted only either to the head stage 73 or the panel stage 76, for example. Further, the moving mechanism unit 70 may move either the optical sheet 10 or the display panel 30 in the coordinate space. In that case, either the optical sheet side mechanism 71 or the display panel side mechanism 74 may be omitted.

The control unit 80 includes a typical computer formed with a CPU 81, a ROM 82, a RAM 83, an input/output interface 84, and the like, for example, and operates according to a computer program and data. The control unit 80 receives the images 45 and 55 from the imaging parts 40 and 50, reads the positional information of the contact areas 14 and the positional information of the panel mark 31 by an image processing program or the like, and outputs control signals 85, 86, 87 based on the information to the sheet holding head 20, the optical sheet side mechanism 71, and the display panel side mechanism 74, respectively. The control signal 85 includes a signal indicating the sheet holding head 20 to start or end the holding action of the optical sheet 10. The control signal 86 includes a signal for moving the head stage 73 (i.e., the optical sheet 10) to a prescribed coordinate. The control signal 87 includes a signal for moving the display panel side mechanism 74 (i.e., the display panel 30) to a prescribed coordinate. An example of the computer programs of the control unit 80 may be a program which causes the computer to execute a procedure for reading the positional information of the contact areas 14 from the image 45 acquired by the imaging part 40, a procedure for reading the positional information of the panel mark 31 from the image 55 acquired by the imaging part 50, and procedure for controlling the moving mechanism unit 70 based on the positional information of the contact areas 14 and the positional information of the panel mark 31 to align the positions of the optical sheet 10 and the optical display panel 30, and laminating the optical sheet 10 and the display panel 30. Now, an example of the alignment action executed by the laminating device 60 will be described. First, positions, magnifications, and the like of the cameras 44 and 54 are adjusted in such a manner that pixels of the cameras 44 and 54 correspond on one on one basis with the coordinates on an XY plane. Further, as shown in FIG. 5, it is assumed that the positional information of the contact areas 14 is acquired as Ma1(xa1, ya1), Ma2(xa2, ya2), and the positional information of the panel mark 31 is acquired as Mb1(xb1, yb1), Mb2(xb2, yb2). Ma1 and Mb2 are defined as coordinates of vertexes of both ends of a specific single cylindrical lens 11. Mb1 and Mb2 are defined as coordinates of two cross-shaped panel marks 31. At this time, the moving mechanism unit 70 is controlled in such a manner that the center Mao of a straight line Ma connecting the point Ma1 and the point Ma2 and the center Mbo of a straight line Mb connecting the point Mb1 and the point Mb2 match with each other, and slopes of the straight line Ma and the straight line Mb match with each other (i.e., angle θa=0).

Next, the first exemplary embodiment will be described in more details.

The optical sheet 10 as a lenticular lens sheet is used in a display device which provides image displays towards a plurality of viewpoints. The optical sheet 10 is abutted against the display face of the display panel 30 and transmits at least a part of light wavelengths of a visible light region. There is no limit set for the materials of the optical sheet 10, and any materials whether it is a nonorganic material or an organic material may be used as long as it is a material which transmits at least a part of light with wavelengths of 400 nm-800 nm Glass or the like can be used as a nonorganic material and plastics or the like can be used as an organic material. However, in general, plastics are often used. As plastics, engineering plastics such as polymethylmetacryrate (PMMA), cyclopolyolefin (COP), polycarbonate (PC), and the like can be used. There is no specific limit set for the thickness of the optical sheet 10. However, it is desirable to be within a range of about 0.05 mm to 0.5 mm for practical use.

FIG. 1 shows schematic illustrations of an example of an optical sheet laminating step according to the first exemplary embodiment. First, as shown in FIG. 1A, the optical sheet is held by using the sheet holding head 20. Then, as shown in FIG. 1B, the light 41 is irradiated towards the contact areas 14 from the light source 43, the distribution of the reflected light 42 is captured by the camera 44, and the positional information of the optical sheet 10 is read by using the acquired image 45. In parallel, as shown in FIG. 1C, the positional information of the panel mark 31 (see FIG. 20) on the display panel 30 is read by using the camera 54. Thereafter, as shown in FIG. 1D, an alignment action for aligning the sheet holding head 20 that holds the optical sheet 10 and the panel stage 76 (see FIG. 3) for fixing the display panel 30 to a prescribed position based on the both positional information to laminate the optical sheet 10 and the display panel 30.

While the panel mark 31 (see also FIG. 20) is read according to the transmission light 52, it is also possible to read it with the reflected light in a case where the material constituting the panel mark has a prescribed reflection property. Further, various actions can be used as the alignment action. For example, it is possible to use a case where the sheet holding head 20 is movable to arbitrary positions and the panel stage 76 (see FIG. 3) is fixed, a case where the panel stage 76 is movable to arbitrary positions and the sheet holding head 20 is fixed, a case where both the sheet holding head 20 and the panel stage 76 are movable to arbitrary positions, etc.

Figure 6:
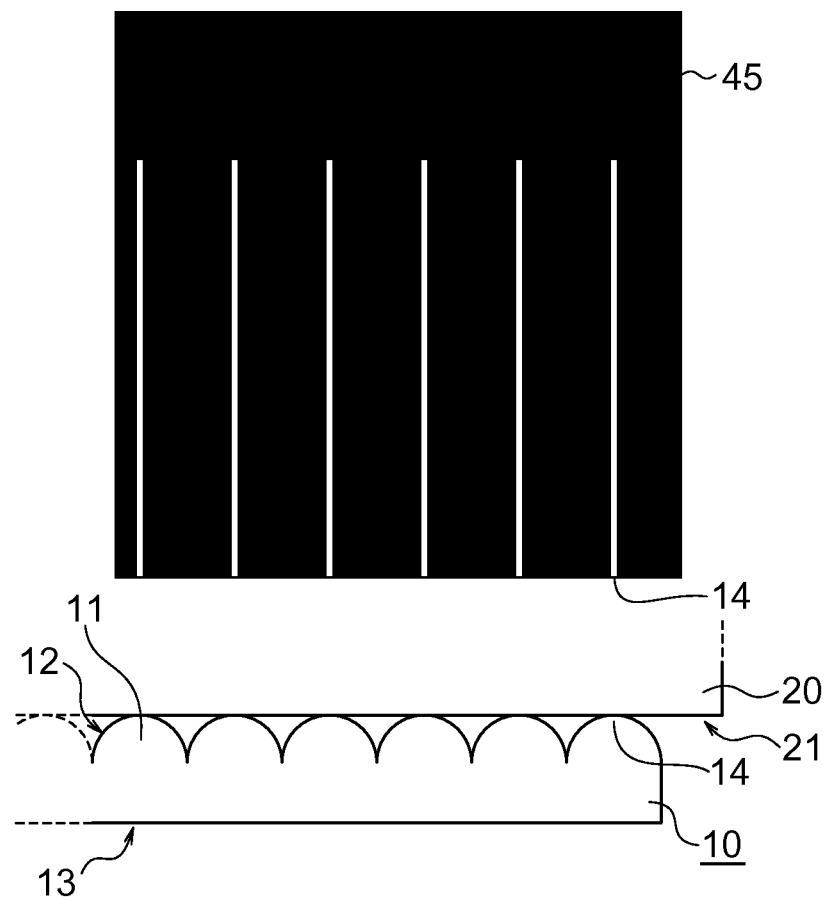
FIG. 6 is an image and a side view showing contact areas between a sheet holding head and an optical element face of an optical sheet according to the first exemplary embodiment.
Figure 7A:
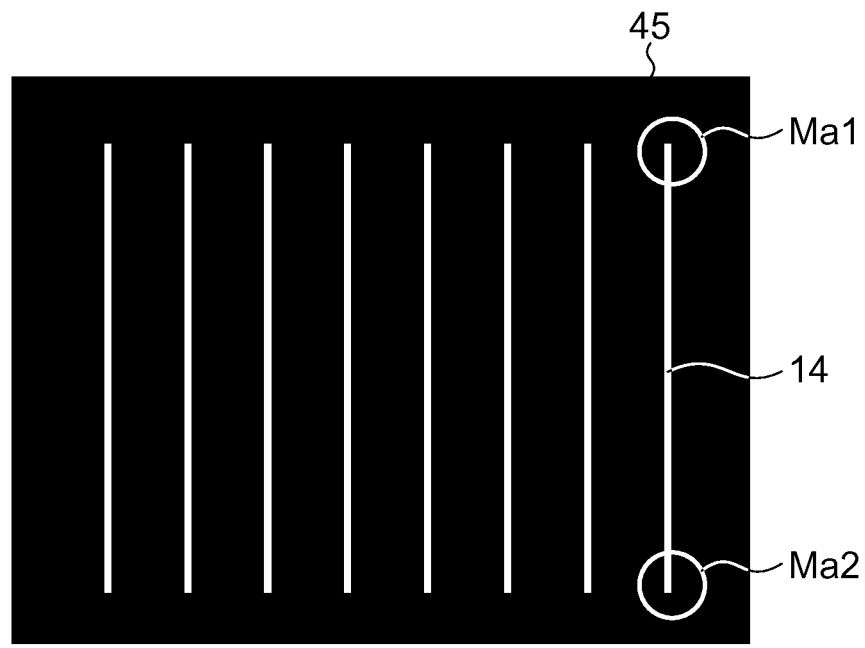
FIG. 7A is another example of an image showing contact areas between the sheet holding head and the optical element face of the optical sheet according to the first exemplary embodiment.
Figure 7B:
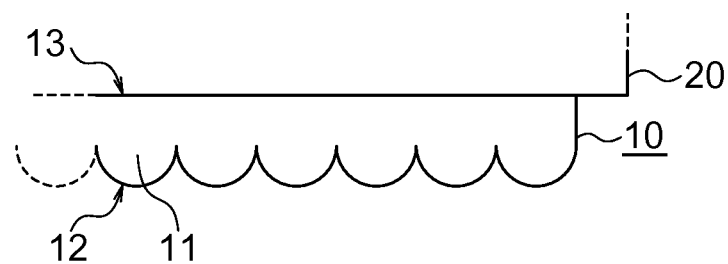
FIG. 7B is a side view showing a state where the sheet holding head and a no-optical-element face of the optical sheet are in contact.

FIG. 6 is an image and a side view showing the contact areas between the sheet holding head and the optical element face of the optical sheet according to the first exemplary embodiment. FIG. 7A is an another example of an image showing the contact areas between the sheet holding head and the optical element face of the optical sheet according to the first exemplary embodiment, and FIG. 7B is a side view showing a state where the sheet holding head and the no-optical-element face of the optical sheet are in contact. Hereinafter, explanations will be provided by referring to FIG. 1, FIG. 6 and FIG. 7.

FIG. 6 shows the image 45 when the contact areas 14 between the optical element face (lens face) 12 of the optical sheet (lenticular lens sheet) 10 and the sheet holding head 20 are captured by using the reflected light 42. The vertexes of the cylindrical lenses 11 forming the lenticular lens sheet and the sheet holding head 20 are in contact linearly, and a plurality of the contact areas 14 are periodically formed according to the period of the cylindrical lenses 11. When the light 41 is irradiated to those contact areas 14, the light is strongly reflected at the contact areas 14. Thus, it is possible to acquire the image 45 in a greater contrast as shown in FIG. 6 compared to the case where the lenticular lens sheet is captured by the transmission light as in the case of the related technique 2 (see FIG. 8 of Patent Document 1).

At this time, as shown in FIG. 7A, it is possible to acquire the positional information required for the alignment action between the optical sheet 10 and the display panel 30 by reading the positional information of at least two points (e.g., the points Ma1 and Ma2) along the longitudinal direction of the cylindrical lenses 11 and finding the positions and slope by utilizing a linear function connecting the two points. In order to increase the reading accuracy, it is also possible to read three or more points, acquire a function by employing the least squares method to the three points, and find the positions and slope by utilizing the function. While the two points (the points Ma1 and Ma2) are located in the far end part (right end in FIG. 7A) with respect to the lens pitch direction of the optical sheet 10 for convenience' sake, the points are not limited only to be in such positions. Points in positions that are on the inner side than the far end part may also be used.

FIG. 7B shows a schematic illustration of a case where the no-optical-element face (no-lens face) 13 of the optical sheet 10 and the sheet holding head 20 are brought into contact. In this case, a distribution according to the lens image forming performance is acquired in the image captured by the reflected light.

As the light source 43, various light sources such as an LED light, a fluorescent light, and the like can be used, and the wavelength can be set arbitrarily according to the spectral sensitivity of a CCD within the camera 44. This is the same for the light source 53.

As shown in FIG. 1A, for picking up the optical sheet 10 by using the sheet holding head 20, techniques such as vacuum absorption, electrostatic absorption, and adhesion can be used. The first exemplary embodiment is structured to read the positional information of the cylindrical lenses 11 by using the reflected light 42, so that there is no limit set for the material of the sheet holding head 20. For example, in a case where the vacuum absorption is used, it is possible to employ a material that is excellent for forming absorption holes, a porous material, a low surface-stiffness material which suppresses damaging to the optical sheet 10, and the like. In a case where adhesion is used, it is possible to employ elastomer made of rubber or a synthetic resin. In any cases, it is not necessary to use a material exhibiting the light transmitting property. Therefore, the sheet holding head 20 of a lower cost and higher functions can be provided compared to the case of using the transmission light.

Particularly, the sheet holding head 20 whose holding face 21 that is a surface to be in contact with the optical sheet 10 is covered by elastomer can be a lens pickup using the adhesiveness of the elastomer, and it is a preferable technique for laminating the optical sheet 10 and the display panel 30. Lamination using the adhesive elastomer can uniformanize the pressure applied to the optical sheet 10 at the time lamination over the entire sheet surface because of the elasticity of the elastomer. Further, it exhibits an effect of suppressing deformation of the cylindrical lenses 11 that may be caused by the applied pressure.

At this time, the optical sheet 10 cannot be held when the adhesiveness of the elastomer is too weak, while the optical sheet 10 cannot be released from the elastomer when the adhesiveness is too strong. Thus, it is necessary to use the elastomer whose adhesiveness is within a proper range for holding the optical sheet 10. The extent of the adhesiveness largely depends also on the measure of the contact areas between the optical element and the elastomer, so that the adhesiveness in accordance with the measure of the contact areas is required. For example, in a case where the contact areas 14 are of point contact as in a case of a fly-eye lens sheet or a prism sheet, it is desirable to use the elastomer having the adhesiveness in a range of 1.0 N/20 mm to 500 N/20 mm. In a case where the contact areas 14 are of linear contact as in a case of a lenticular lens sheet, it is desirable to use the elastomer having the adhesiveness in a range of 0.1 N/20 mm to 100 N/20 mm.

Further, air bubbles are formed inside the contact face between the optical sheet 10 and the display panel 30 when the pressure at the time of lamination is too small, while deformation and damage of the optical sheet 10 or damage of the display panel 30 are generated when the pressure is too large. Thus, it is necessary to perform lamination within a proper range regarding the applied pressure as well. The extent of the applied pressure also depends largely on the rigidity of the optical sheet 10 and the display panel 30, so that the applied pressure in accordance with the rigidity is required. For example, in a case where a plastics-made lenticular lens sheet in a thickness of 0.2 mm is laminated on a liquid crystal display panel in a total thickness of 1.0 mm, it is desirable to set the applied pressure in a range of 0.01 MPa to 1.0 MPa.

Figure 1B:
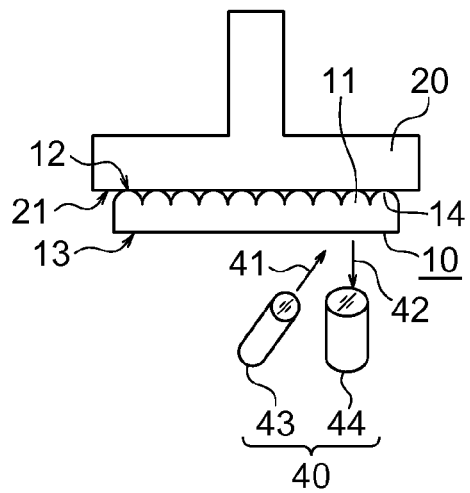
Figure 8A:
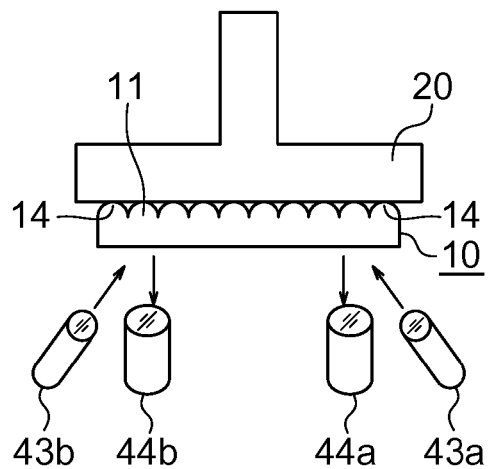

In a case shown in FIG. 8A, in a step for reading the positional information of the optical sheet 10 held by the sheet holding head 20, a plurality of cameras 44a and 44b (a plurality of light sources 43a and 43b as necessary) are provided in the lens pitch direction for more accurately reading the positional information of the plurality of cylindrical lenses 11 within the optical sheet 10. The reason for doing so is that the accuracy of the linear function described above can be improved and the pitch accuracy from the distance of the pitch direction can be calculated by using not only the positional information of the single cylindrical lens 11 but the positional information of the plurality of cylindrical lenses 11. As shown in FIG. 1B, in a case where the same effect is to be achieved by a single camera 44, it is necessary to move the camera 44 or the sheet holding head 20 for reading the positions of the plurality of cylindrical lenses 11. In the meantime, it is unnecessary to move those with the use of the plurality of cameras 44a and 44b, so that the laminating step can be shortened. Further, in the case where the plurality of cameras 44a and 44b are provided, it is desirable to read the positional information of both cylindrical lenses 11 located at both ends in the lens pitch direction as much as possible. This is because the accuracy of the fluctuation amount of the read lens pitch can be improved as the isolated distance in the pitch direction becomes greater.

Figure 1C:
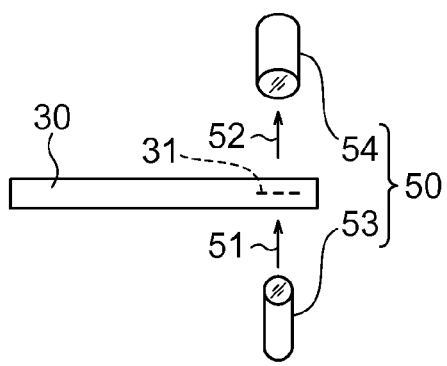
Figure 1D:
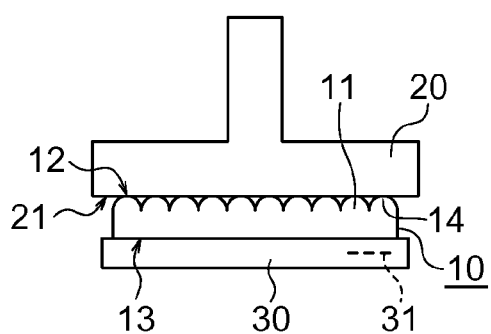
Figure 8B:
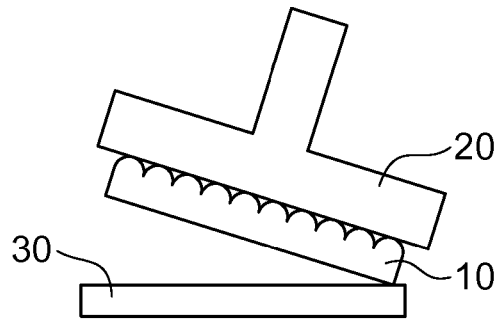

Through reading the positional information of the optical sheet 10 shown in FIG. 1B and reading the positional information of the panel mark 31 shown in FIG. 1C in parallel, the time for the laminating step can be shortened. When performing lamination shown in FIG. 1D, it is desirable to perform the lamination by tilting the sheet holding head 20 with respect to the display panel 30 as shown in FIG. 8B so that air bubbles are not formed between the optical sheet 10 and the display panel 30.

As adhesive materials for laminating the optical sheet 10 and the display panel 30, a thermosetting adhesive, a UV (ultraviolet) curable adhesive, a visible light curable adhesive, and the like can be used. However, it is desirable to use the UV curable adhesive or the visible light curable adhesive having small thermal load at the time of setting. Further, other than the adhesives, a double-side transparent adhesive film having an adhesive can be used. The both-side transparent adhesive film has advantages that there is no thermal load and no adhesive forced out from the lens end face.

Figure 8C:
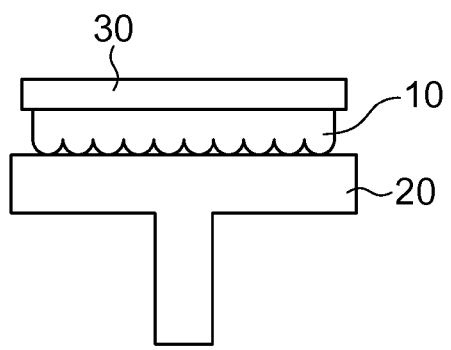

In a case shown in FIG. 8C, the sheet holding head 20 is provided on the lower side of the display panel 30. Even in this state, it is possible to laminate the optical sheet 10 and the display panel 30 as in the case of FIG. 1.

As an exemplary advantage according to the invention, the present invention makes it possible to overcome various issues of the cases using the transmission light in one effort through using not the transmission light but the reflected light for reading the positional information of the optical sheet, so that the reading accuracy of the positional information of the optical sheet can be improved. Therefore, it is possible to achieve high accuracy and to improve the yield in the optical sheet laminating step.

Second Exemplary Embodiment

Figure 9A:
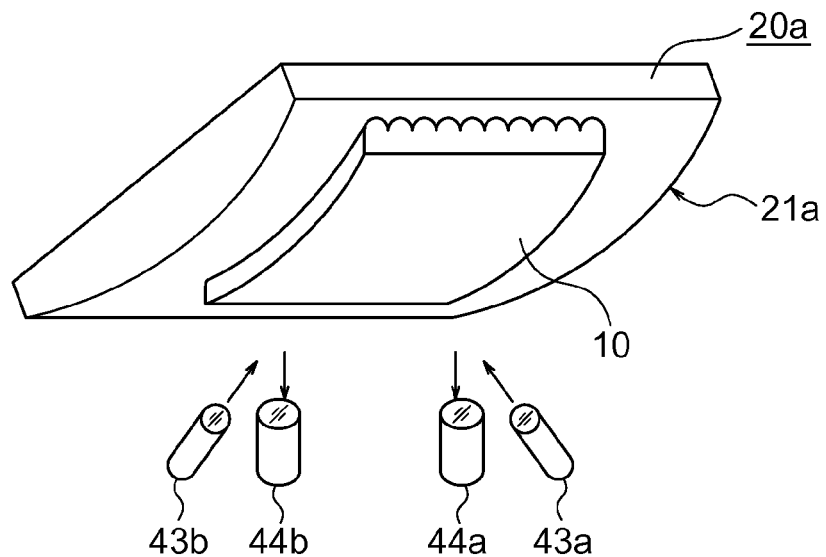
Figure 9B:
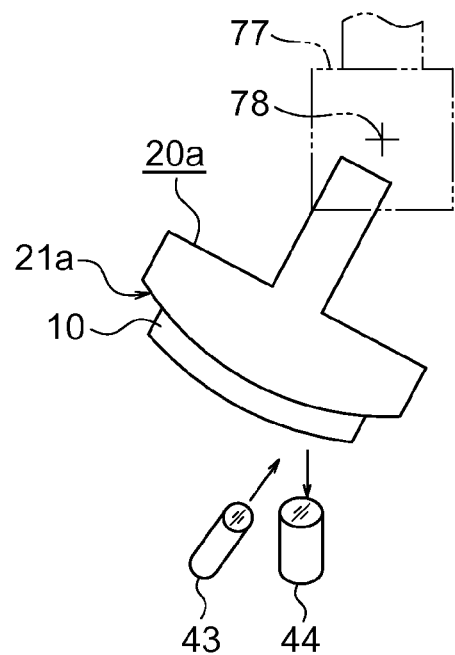
Figure 9C:
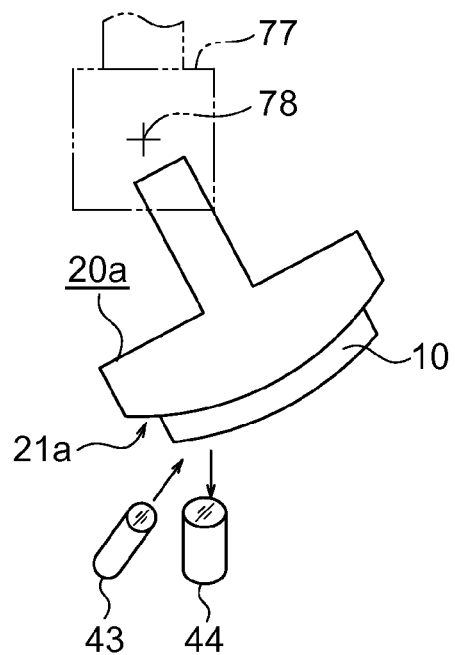

FIG. 9 shows a sheet holding head according to a second exemplary embodiment, in which FIG. 9A is a perspective view, and FIG. 9B and FIG. 9C are schematic illustrations showing a positional information reading action. Hereinafter, explanations will be provided by referring to FIG. 9.

It is a feature of the second exemplary embodiment that a holding face 21a of a sheet holding head 20a is in a curved shape. FIG. 9A shows an example of the curved-shape holding face 21a. In the sheet holding head 20a, the holding face 21a for holding the optical sheet 10 is in an arc shape with a curvature. Note here that it is desirable to provide a plurality of cameras 44a and 44b (and light sources 43a and 43b as necessary).

While the shape of the holding face 21a of the sheet holding head 20 is in an arc form in the second exemplary embodiment, any other shapes can be employed as long as the surface holding the optical sheet 10 is a curved face. However, with the arc shape, the radius curvature becomes constant regardless of the rotation angle. Thus, the arc shape has an advantage of making it easy to set the camera positions for reading the positional information of the lenticular lens sheet, to control reading, to set the rotation axis for lamination, to control the lamination, etc., described later.

As shown in FIG. 9B and FIG. 9C, it is possible to acquire a plurality of pieces of positional information of the optical sheet 10 according to the rotation angles through rotating the sheet holding head 20a having the arc-shaped holding face 21a without moving the camera 44. Further, in the second exemplary embodiment, a rotary mechanism 77 is provided between the sheet holding head 20a and the head stage 73 (FIG. 3). The rotary mechanism 77 is formed by a motor, a reduction gear, and the like, for example, and rotates the sheet holding head 20a about a rotation axis 78. The rotary mechanism 77 also operates according to instructions from the control unit 80 (FIG. 4) like the head stage 73 (FIG. 3) and the like.

Figure 10A:
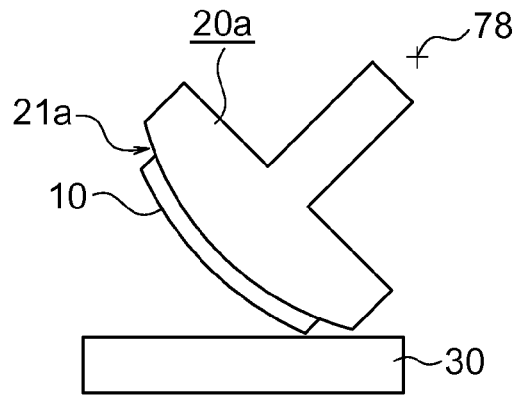
FIGS. 10A-10C show schematic illustrations showing laminating steps according to the second exemplary embodiment, in which the steps proceed in order of FIG. 10A, FIG. 10B, and FIG. 10C.
Figure 10B:
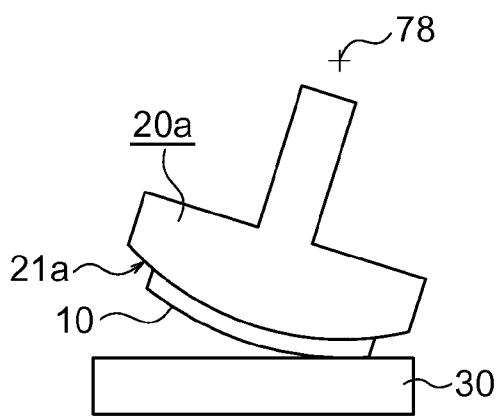
Figure 10C:
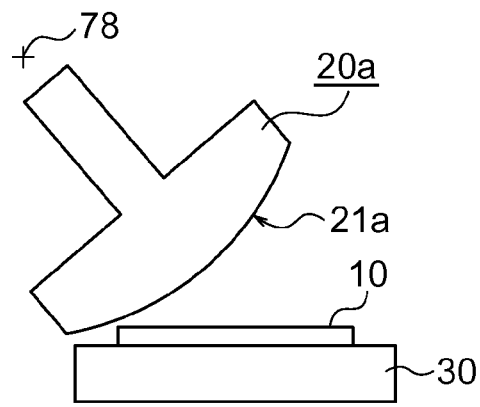

FIG. 10 shows schematic illustrations showing laminating steps according to the second exemplary embodiment, in which the steps proceed in order of FIG. 10A, FIG. 10B, and FIG. 10C. Hereinafter, explanations will be provided by referring to FIG. 10.

As shown in FIG. 10, the optical sheet 10 held by using the sheet holding head 20a is brought into contact with the display panel 30, the rotation axis 78 of the sheet holding head 20a is rotated, and the display panel 30 or the rotation axis 78 itself is relatively moved by synchronizing with the rotary action. Thereby, the optical sheet 10 can be laminated on the display panel 30 continuously from the end of the optical sheet 10 towards the end on the opposite side.

At this time, as shown in FIG. 10A, it is desirable to keep the part holding the optical sheet 10 away from the display panel 30 so as not be in contact before the sheet holding head 20a is rotated, and to rotate the sheet holding head 20a to start to laminate the optical sheet 10 as shown in FIG. 10B. If the optical sheet 10 and the display panel 30 are brought into contact before rotating the sheet holding head 20a, air bubbles may be formed in the adhesive used for laminating the contact face because of deviation caused due to a slight difference in the applied pressures before and after the rotation. Further, at the end of the laminating action, it is desirable to rotate the sheet holding head 20a until the sheet holding head 20a is completely separated from the optical sheet 10 as shown in FIG. 10C after the optical sheet 10 and the display panel 30 are laminated via the entire surface. This also has an effect of reducing form of the air bubbles as in the case of the start of the laminating action.

Figure 11A:
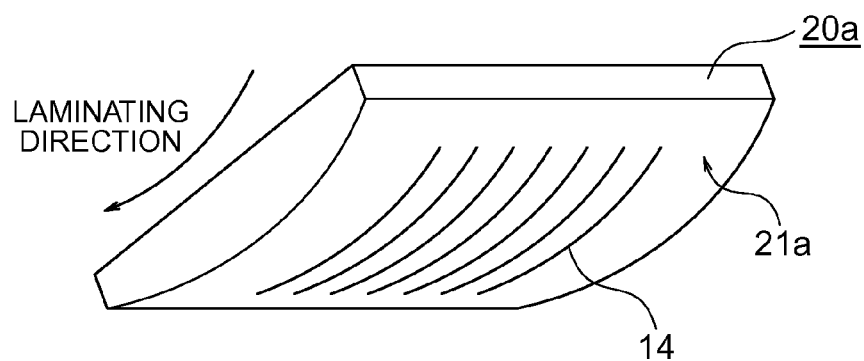
Figure 11B:
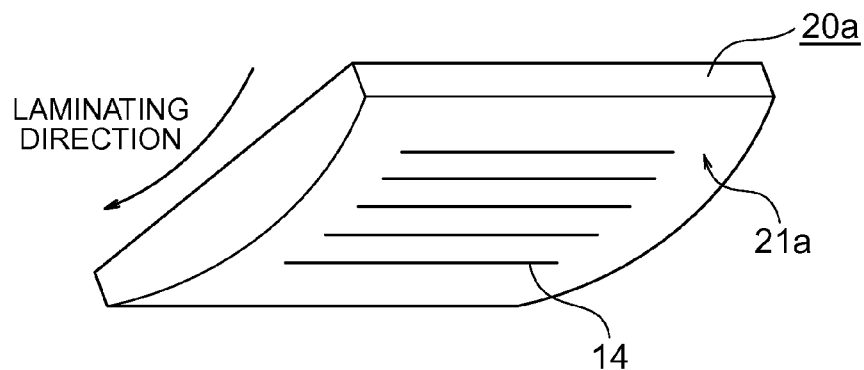

FIG. 11 shows perspective views of a part of the laminating step according to the second exemplary embodiment, in which FIG. 11A is a case where the contact areas between the sheet holding head and the optical sheet are in parallel to the arc tangent direction of the sheet holding head, and FIG. 11B is a case where the contact areas between the sheet holding head and the optical sheet are orthogonal to the arc tangent direction of the sheet holding head. Hereinafter, explanations will be provided by referring to FIG. 10 and FIG. 11.

When holding the optical sheet 10 with the sheet holding head 20a, it is desirable to set the lens pitch longitudinal direction and the tangent direction of the arc to be in parallel. In that case, when laminating the optical sheet 10 and the display panel 30 as shown in FIG. 11A, there are always the contact areas 14 between the sheet holding head 20a and the optical sheet 10. Thus, the lens holding power is stabilized. In the meantime, when the lens pitch longitudinal direction and the tangent direction are orthogonal as shown in FIG. 11B, the contact areas 14 between the sheet holding head 20a and the optical sheet 10 become orthogonal to the arc tangent direction (i.e., the laminating direction) when laminating the optical sheet 10 and the display panel 30. When the sheet holding head 20a is rotated at the time of lamination, regions where there are no contact areas 14 between the optical sheet 10 and the sheet holding head 20a are generated according to the periods of the lens pitches. Thus, the applied pressure becomes nonuniform, which may result in forming air bubbles. Further, stress concentration may work on the gauge sections of the cylindrical lenses 11, which may result in generating cracks in the cylindrical lenses 11 in the worst case.

With the second exemplary embodiment, linear air bubbles between the optical sheet 10 and the display panel 30 can be greatly eased through laminating them by using the sheet holding head 20a. The sheet holding head 20a holds the optical sheet 10 in a warped state, so that it is not possible to employ a laminating method which superimposes the panel mark 31 of the display panel 30. Therefore, it is extremely valuable to separately capture images of the positional information of the optical sheet 10 and the positional information of the panel mark 31 of the present invention.

The holding power by the rigidity of the optical sheet 10 is deteriorated when the radius curvature of the sheet holding head 20a is too small, while the effect of easing the linear air bubbles is reduced when it is too large. Thus, it is desirable for the curvature radius of the sheet holding head 20a to be within a range of 50 mm to 500 mm. However, considering the distance from the rotation axis 78 to the tip of the sheet holding head 20a as a factor for determining the height of the laminating device, it is more desirable for the radius curvature to be within a range of 50 mm to 200 mm.

Figure 12:
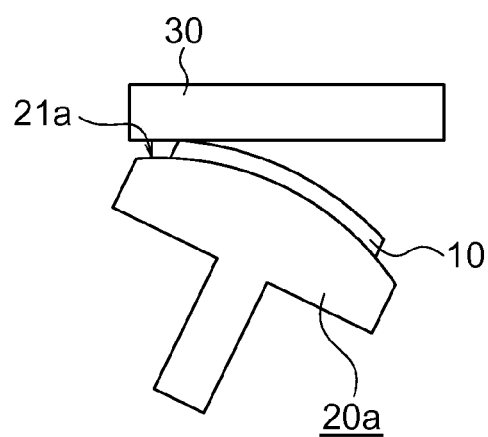
FIG. 12 is a schematic illustration showing a case where the sheet holding head according to the second exemplary embodiment is provided on the lower side of the display panel.

FIG. 12 is a schematic illustration showing a case where the sheet holding head 20a is provided on the lower side of the display panel 30. Even in this state, it is possible to laminate the optical sheet 10 and the display panel 30 as in the explanations provided above.

Third Exemplary Embodiment

A third exemplary embodiment shows an example of a laminating method which reads the pitch accuracy of at least two areas of an optical sheet being held to an arc-shaped holding head, and corrects the pitch accuracy according to the read result.

Figure 13:
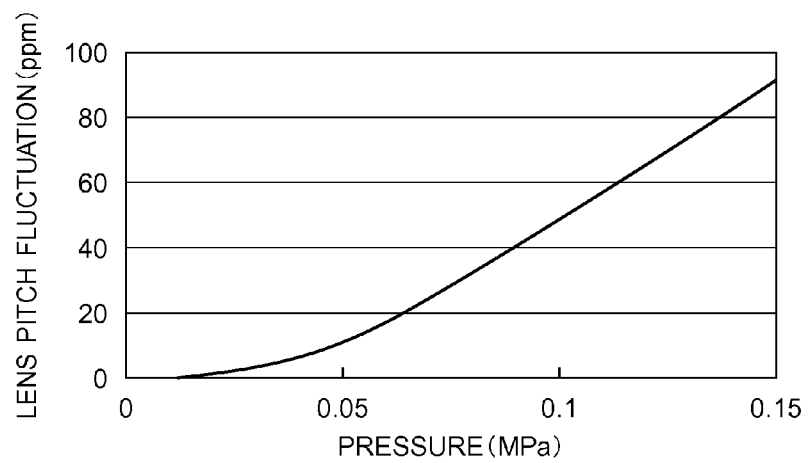
FIG. 13 is a graph showing an example of a relation between a laminating pressure and a lens pitch fluctuation amount before and after the lamination according to the second exemplary embodiment.

FIG. 13 is a graph showing an example of a relation between a laminating pressure and a lens pitch fluctuation amount before and after the lamination when the method described in the second exemplary embodiment is used. In this example, the laminating pressure and the lens pitch fluctuation amount are roughly in a linear relation. However, the relation between the laminating pressure and the lens pitch fluctuation amount also depends on mechanical specifications such as the thickness of the lenticular lens sheet, the elastic constant, as well as the structure of the sheet holding head, the laminating method of the materials and the like. Thus, the relation is to be known in advance as a graph shown in FIG. 13, for example. Hereinafter, the lens pitch fluctuation amount is expressed as "$\Delta L$".

Figure 14A:
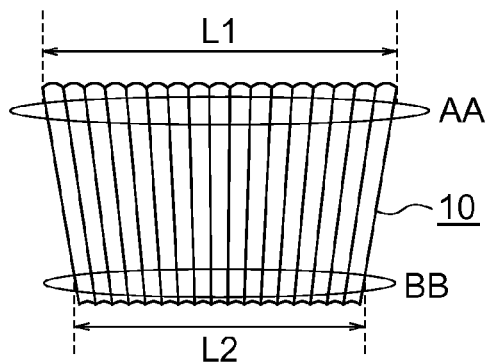
FIG. 14A is a plan view showing lenticular lenses in nonuniform lens pitches according to a third exemplary embodiment.
Figure 14B:
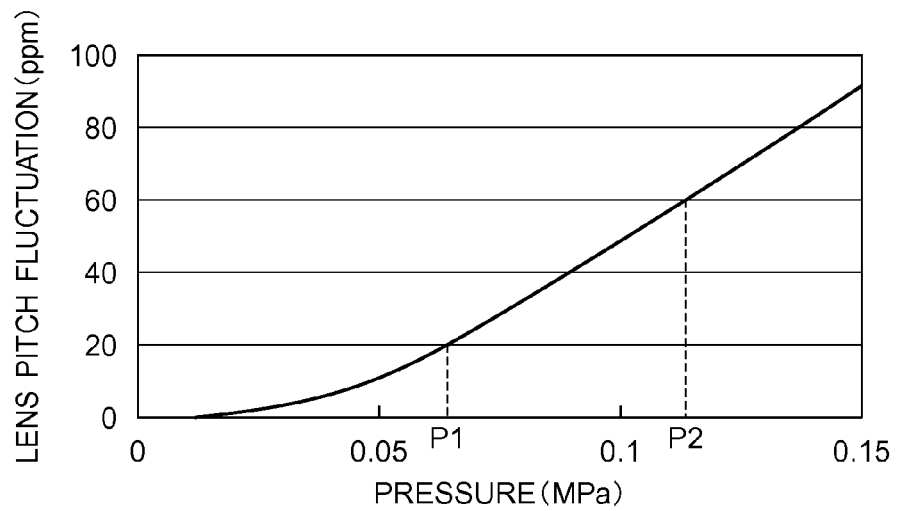
FIG. 14B is a graph showing a relation between the laminating pressure and the lens pitch fluctuation amount.
Figure 14C:
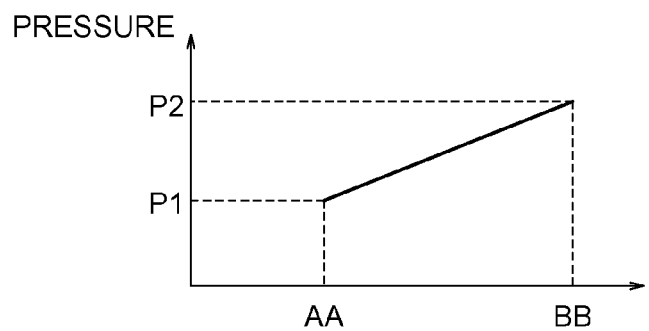
FIG. 14C is a graph showing a laminating pressure set to be in a proper value.

First, before the lenticular lens sheet laminating step, the positional information of the lenticular lens sheet held by the sheet holding head is read, i.e., lens pitch L1 in a part (AA part) corresponding to the start of lamination in the end part of the lens longitudinal direction and lens pitch L2 in a part (BB part) corresponding to the end of the lamination in the other end part as shown in FIG. 14A. Then, differences of L1 and L2 with respect to original lens pitch L0, i.e., $\Delta L1 = L1 - L0$, $\Delta L2 = L2 - L0$, are acquired. Here, it is assumed that $\Delta L1 = -20$ ppm, $\Delta L2 = -60$ ppm. Subsequently, referring to FIG. 14B, the laminating pressure is set according to the rotation angle of the sheet holding head in such a manner that P1 becomes a laminating pressure required to correct 0 ppm and P2 becomes a laminating pressure required to correct 60 ppm. Then, as shown in FIG. 14C, the laminating pressure according to the setting is applied from the AA point to the BB point to make the lens pitch after the lamination appropriate.

Figure 15A:
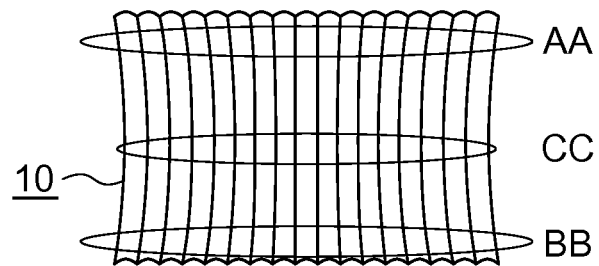
FIG. 15A is a plan view showing another example of the lenticular lenses in nonuniform lens pitches according to a third exemplary embodiment.
Figure 15B:
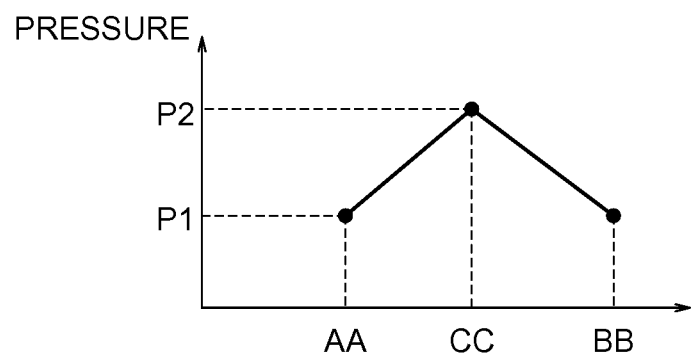
FIG. 15B is a first graph showing a laminating pressure set to be in a proper value.
Figure 15C:
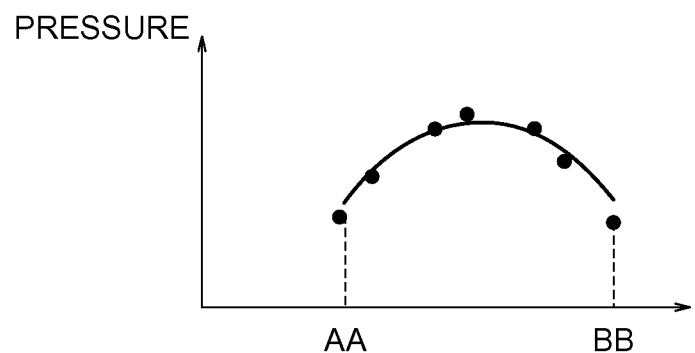
FIG. 15C is a second graph showing a laminating pressure set to be in a proper value

The lens pitch reading points are not limited only to the two points such as the lamination start and the lamination end, but may be three points or more. Particularly, in an example shown in FIG. 15A where the lens pitch is nonuniform, a CC point in the middle of the lens longitudinal direction may be read. This makes it possible to perform applied pressure control by having the CC point as shown in FIG. 15B as an inflection point, so that the effect of correcting the lens pitch can be improved further. As described in the first exemplary embodiment, it is naturally possible to perform pitch correction by utilizing the function according to the least squares method (FIG. 15C).

As a method for varying the applied pressure, it is desirable to set the pressure by changing the push-in amount of the sheet holding head (use the move by the head stage 73 in the Z-axis direction in the structure of FIG. 3, for example). In this case, the relation between the push-in amount and the pressure working on the panel changes depending on the methods such as absorption and adhesion described above and the materials constituting the sheet holding head. Thus, it is desirable to grasp the relation in advance. Further, it is also possible to use a pressure variable device such as an air pressure cylinder. However, there are cases where the pressure adjustment delays for the laminating speed with the pressure variable device, so that a simple pressure control can be easily done with the use of the push-in fluctuation amount.

With the third exemplary embodiment, the lenticular lens sheet with nonuniform lens pitch can be laminated with high accuracy. Thus, the third exemplary embodiment not only is capable of providing the highly accurate laminating method but also capable of contributing to lower the cost by improving the yield since the pitch tolerance at the time of lens manufacture is increased.

Fourth Exemplary Embodiment

A fourth exemplary embodiment shows an example of a pitch accuracy reading method in a specific position of a lenticular lens sheet held by a sheet holding head.

Figure 16A:
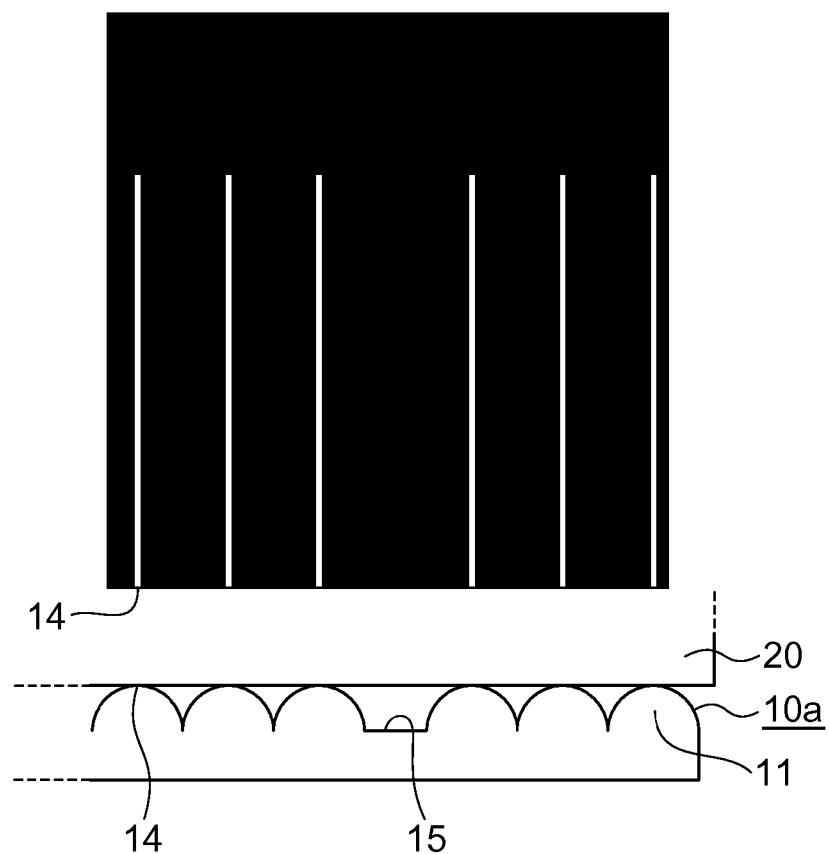
FIG. 16A shows an image and a side view showing contact areas between the sheet holding head and an optical element face of the optical sheet shown in FIG. 16B.
Figure 16B:
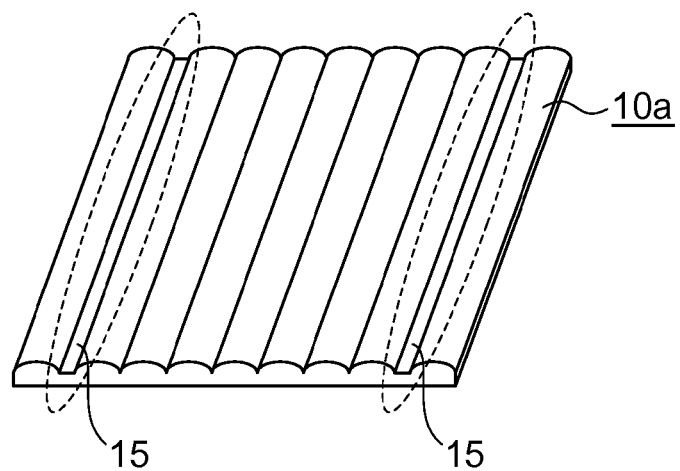
FIG. 16B is a perspective view showing a first optical sheet according to a fourth exemplary embodiment.

FIG. 16B shows an example of an optical sheet (lenticular lens sheet) 10a used in the fourth exemplary embodiment. In an end part along the lens pitch direction, at least a single non-periodical section 15 where the periods of the cylindrical lenses 11 vary is provided as a mark for reading positional information of the optical sheet 10a. That is, there are areas (two non-periodical sections 15) where the periods of the cylindrical lenses 11 vary provided at least in both ends of the optical sheet 10a. FIG. 16A shows an example of an image acquired by irradiating light to the contact areas 14 between the optical sheet 10a and the sheet holding head 20 and capturing the reflected light thereof. In the first to third exemplary embodiments, the contact area 14 of an arbitrary cylindrical lens 11 is read. In the meantime, in the fourth exemplary embodiment, the pitch of a specific position of the optical sheet 10a can be read with the clear specific positions, i.e., the non-periodical sections 15. In the fourth exemplary embodiment, the sectional view of the non-periodical section 15 may be in any form and may not need to be flat, as long as it is lower than the height of the cylindrical lens 11 in order to read the contact area 14.

Figure 17A:
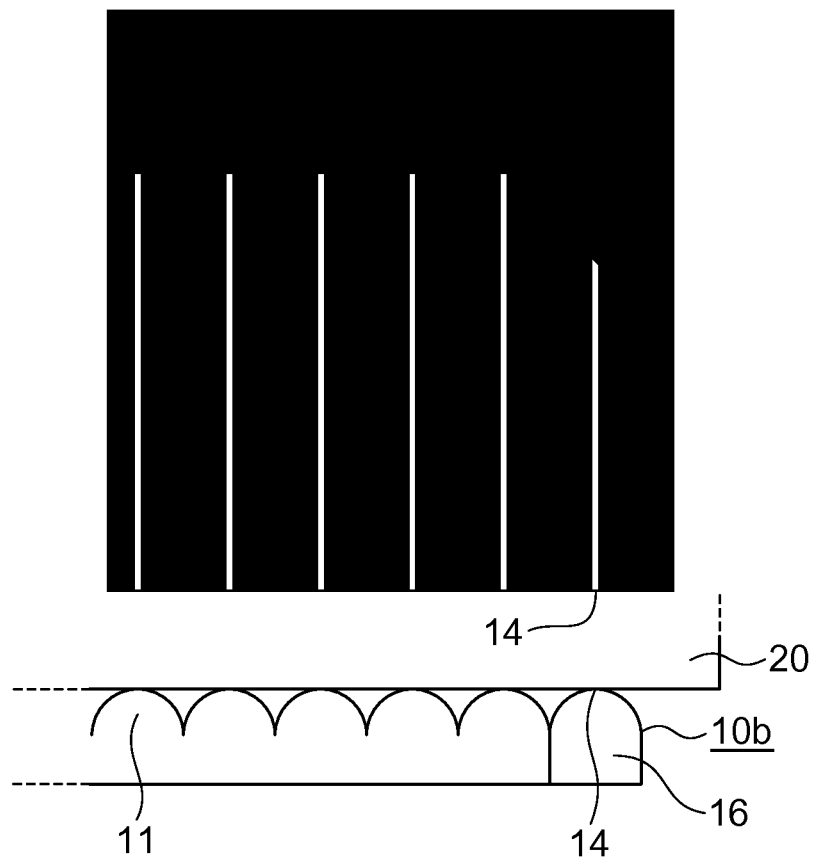
FIG. 17A shows an image and a side view showing contact areas between the sheet holding head and an optical element face of the optical sheet shown in FIG. 17B.
Figure 17B:
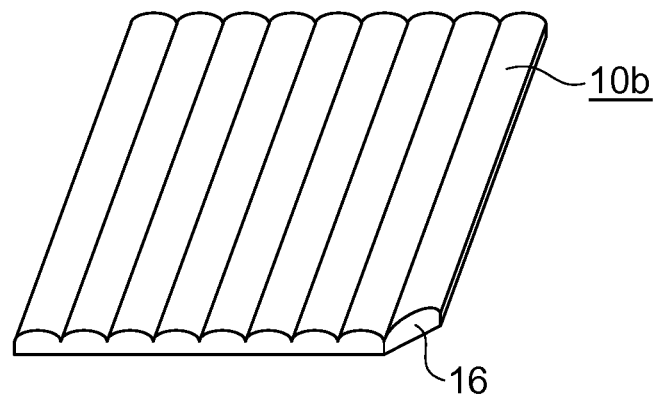
FIG. 17B is a perspective view showing a second optical sheet according to the fourth exemplary embodiment.

Further, as a modification example, FIG. 17A shows an example of an optical sheet (lenticular lens sheet) 10b. As a mark for reading the positional information of the optical sheet 10b, at least a single notch 16 is provided in a corner of the optical sheet 10b. FIG. 17B shows an example of an image acquired by irradiating light to the contact areas 14 between the optical sheet 10b and the sheet holding head 20 and capturing the reflected light thereof. In a corner of the cylindrical lens 11, the notch 16 is provided as a mark for reading the positional information of the optical sheet 10b. This makes it possible to read the pitch in a specific position of the optical sheet 10b.

Figure 18A:
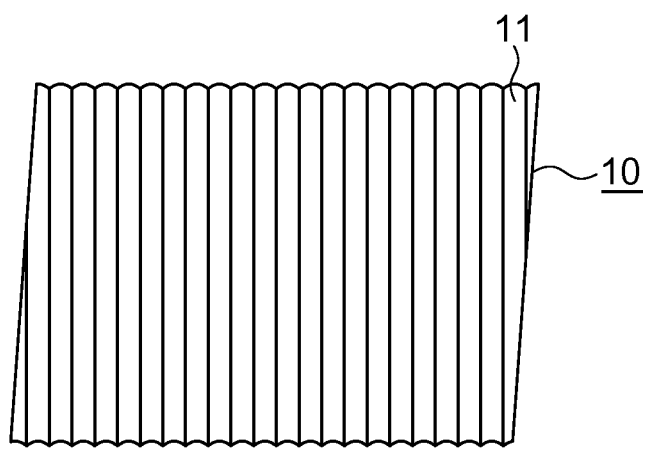
FIG. 18A is a plan view showing a third optical sheet according to the fourth exemplary embodiment.
Figure 18B:
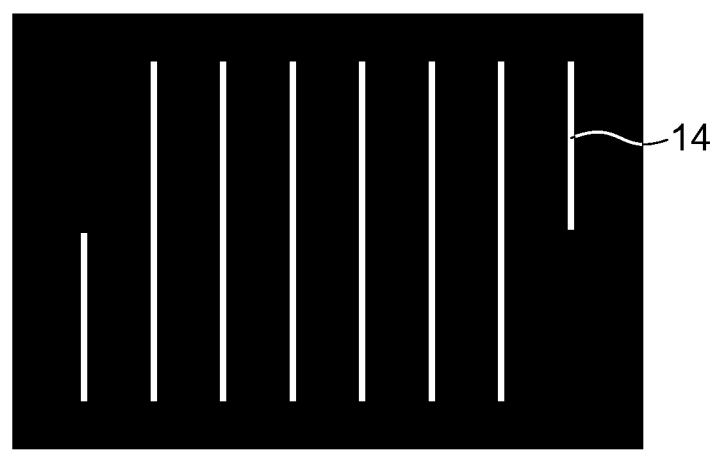
FIG. 18B is an image showing contact areas between the sheet holding head and an optical element face of the optical sheet shown in FIG. 18A.

In the explanations of FIG. 7 regarding the first exemplary embodiment, it is depicted that the two points Ma1 and Ma2 of the cylindrical lens 11 do not necessarily have to be in the far end part of the optical sheet 10. This is because the contact areas 14 between the optical sheet 10 and the sheet holding head may come to be in a state shown in FIG. 18B in some cases. As shown in FIG. 18A, in a case of forming the external shape of the lenticular lens sheet by die-cutting process or cutting process, there may be generated a slight rotation shift in a cut line that is in parallel to the longitudinal direction of the cylindrical lens 11. Particularly with a highly minute lenticular lens sheet with a pitch of 200 μm or less, there is a possibility of losing a prescribed number of lenses depending on the pitch. Therefore, by anticipating the lens missing part, an image of the contact area 14 of the arbitrary cylindrical lens 11 in an arbitrary pitch direction on the inner side than the far end part is to be used.

However, only the contact areas according to repetition of a specific period are to appear in this image, so that it is difficult to specify the read position with respect to the external shape of the lenticular lens sheet. Therefore, dummy cylindrical lenses of more than the number of lenses lost in the cutting are required. In this indefinite reading state, a considerable number of dummy lenses are required. As a result, the external shape of the lenticular lens sheet becomes larger considerably with respect to the display panel.

In the meantime, with the fourth exemplary embodiment, the specific position of the lenticular lens sheet is known. Thus, it only requires the number of dummy lenses that are lost in the cutting, so that the external shape of the lenticular lens sheet only becomes larger slightly with respect to the display panel. This contributes to narrowing the frame of the display device that employs this method.

Fifth Exemplary Embodiment

Figure 19A:
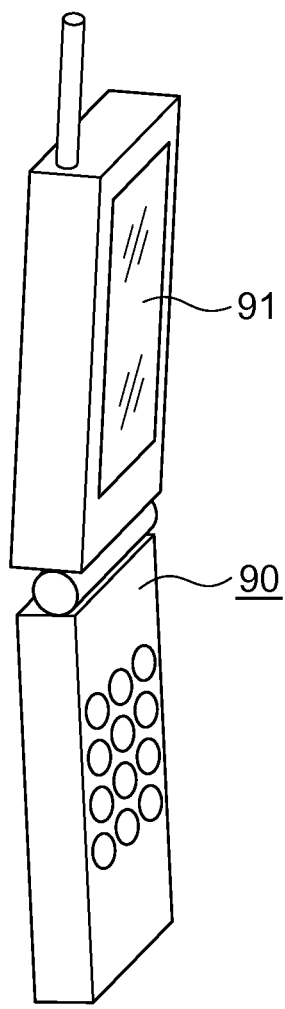
FIG. 19A is a perspective view showing a mobile terminal device on which a display device having an optical sheet laminated on a display panel by using the present invention is loaded.

FIG. 19A is a perspective view showing a mobile terminal device 90 on which a display device 91 having an optical sheet laminated on a display panel by using the present invention is loaded. As shown in FIG. 19A, the display device 91 is loaded on the mobile terminal device 90 such as a mobile phone.

Figure 19B:
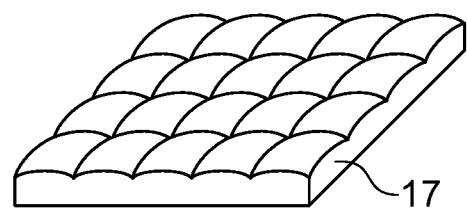
FIG. 19B is a perspective view showing a fly-eye lens as an optical sheet.

While the cases of using the lenticular lens sheet are described in the first to fifth exemplary embodiments, a fly-eye lens 17 (FIG. 19B), a prism sheet, and the like can be used as well. The same effects as those of each of the exemplary embodiments can be achieved also in the cases using those.

While the present invention has been described by referring to each of the exemplary embodiments, the present invention is not limited to each of those exemplary embodiments. Various modification and changes occurred to those skilled in the art can be applied to the structures and details of the present invention. Further, the present invention includes adequate combinations of a part or a whole part of the structures of each of those exemplary embodiments. Next, the present invention will be summarized. A film laminating method according to the present invention is an optical sheet laminating method which laminates an optical sheet having a plurality of optical elements formed thereon to a display panel where a plurality of electro-optical elements formed thereon by using a sheet holding head, and the method includes: a first reading step which brings the optical element face of the optical sheet to be in contact with the sheet holding head, irradiates light to the contact areas from a no-optical-element face of the optical sheet, and reads the contact areas between the optical elements and the sheet holding head by using a first imaging device according to a distribution of reflected light; an alignment step which aligns positions of the optical sheet and the display panel according to the first reading step, and moves the sheet holding head to a prescribed position; and a step which laminates the optical sheet and the display panel through relatively moving the sheet holding head and the display panel after bringing the optical sheet to be in contact with the display panel. With this structure, the positional information of the optical sheet is read by using the reflected light. Thus, the sheet holding head does not need to have a light transmitting property, so that there is no limit set for the material of the head. For example, in a case of a stereoscopic display device in which a lenticular lens sheet is laminated, the positional relation between the vertexes of the lens face of the lenticular lens sheet and the pixels of the display panel is important. As in the present invention, through reading the contact areas between the optical sheet and the sheet holding head, the vertex areas of the lens face can be recognized securely. Therefore, the optical sheet positional information reading accuracy required for laminating the optical sheet can be improved. Further, even in a case where there are large variations in the radius curvatures of each lens or in a case where there is distortion generated in the lens film itself, the reading accuracy is not deteriorated since the vertex areas of the lens face of the lenticular lens sheet still come in contact with the sheet holding head.

A film laminating method according to the present invention is an optical sheet laminating method which laminates an optical sheet having a plurality of optical elements formed thereon to a display panel where a plurality of electro-optical elements formed thereon by using a sheet holding head, and the method includes: a first reading step which brings a no-optical-element face of the optical sheet to be in contact with the sheet holding head, irradiates light to the contact areas from the optical element face of the optical sheet, and reads the contact areas between the optical elements and the sheet holding head by using a first imaging device according to a distribution of reflected light; an alignment step which aligns positions of the optical sheet and the display panel according to the first reading step, and moves the sheet holding head to a prescribed position; and a step which laminates the optical sheet and the display panel through relatively moving the sheet holding head and the display panel after bringing the optical sheet to be in contact with the display panel.

The optical element may be a cylindrical lens that is a convex lens having a columnar surface, and the optical sheet may be a lenticular lens sheet film where a plurality of the cylindrical lenses are arranged at a same lens pitch. Further, the optical element may be a fly-eye lens that is a convex lens having a columnar surface, and the optical sheet may be a fly-eye lens film having a plurality of the fly-eye lenses arranged at individual lens pitches in a first direction and in a second direction orthogonal to the first direction.

The sheet holding head may be in an arc shape having a curvature, and the face holding the optical sheet may be a curved face. Through performing lamination by using the arc-shaped sheet holding head, linear air bubbles formed between the optical sheet and the display panel can be suppressed. At this time, the lens longitudinal direction of the lenticular lens sheet film and the direction of the relative motion for laminating the lenticular lens sheet by using the sheet holding head may be in parallel. Further, the tangent direction of the arc of the arc type sheet holding head may be in parallel to the lens longitudinal direction of the lenticular lens sheet film, and the direction of the relative motion for laminating the lenticular lens sheet film by using the arc type sheet holding head may be in parallel.

In the contact face between the lenticular lens sheet and the sheet holding head, the lens vertexes of the cylindrical lenses constituting the lenticular lens sheet and the sheet holding head are in linear contact in a periodically lined state. FIG. 11 shows illustrations of the contact areas 14 between the arc-shaped sheet holding head 20a and the lenticular lens sheet. In a case where the lens longitudinal direction and the laminating direction are in parallel (FIG. 11A), there always exist the contact areas at the time of lamination, so that lamination can be done with a stable holding power. In a case where the lens longitudinal direction and the laminating direction are orthogonal (FIG. 11B), there periodically exist sections where the lenticular lens sheet and the sheet holding head are not in contact at the time of lamination. Thus, a stable holding power cannot be acquired, and air bubbles may be mixed in some cases.

In the step of laminating the optical sheet and the display panel, the laminating pressure applied to the sheet holding head may not be constant in the middle of the relative motion executed for lamination. Further, in the first reading step which reads the contact areas between the optical element and the sheet holding head, the laminating pressure applied to the sheet holding head in the step of laminating the optical sheet and the display panel may be set based on a result of calculation after calculating the shift amount from a designed value of the lens pitch of the lens film. The laminating pressure applied to the sheet holding head may be set by the push-in amount of the sheet holding head to the display panel. In those cases, even if the lens pitch of the lenticular lens sheet is fluctuated in a stage before lamination, it is possible to change it to the proper lens pitch after lamination by adjusting the laminating pressure.

As a film mark, a section where the periods of the optical elements vary may exist at least on one side or in both ends of one direction of the optical sheet. Further, a notch may be provided at least in one of the corners of the optical sheet. In those cases, a partially feature area can be provided in the contact area between the optical sheet and the sheet holding head through providing the section with different periods in a part of the optical sheet.

At least two or more imaging cameras constituting the first imaging device of the present invention may be provided, and at least two or more videos may be acquired at the time of executing the first reading step to use the videos in the alignment step. In order to read the positional information of the optical sheet, it is necessary to acquire the positional information of at least two points or more. Through providing two or more devices for acquiring the positional information of the optical sheet, the necessary positional information can be acquired by a single filming.

The sheet holding head of the present invention may hold the optical sheet via the entire surface including the contact areas used in the first reading step. The surface of the sheet holding head may be covered by adhesive elastomer, and the optical sheet may be held by the adhesive power of the elastomer. By providing elastic adhesive elastomer on the surface of the sheet holding head, the pressure at the time of lamination can be uniformanized. Further, deformation of the lenticular lens sheet at the time of lamination can be eased.

Figure 20:
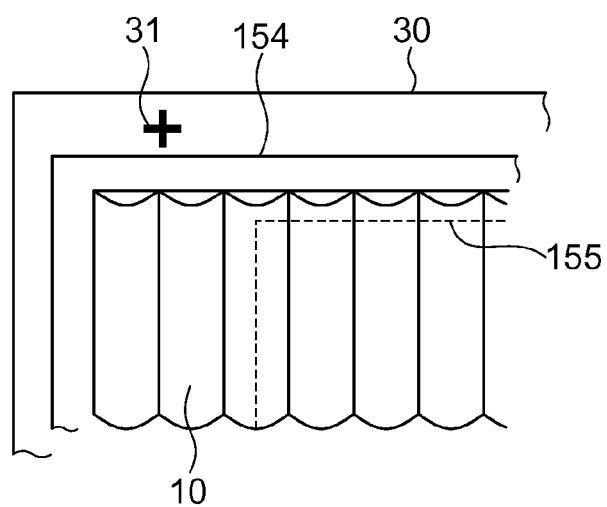
FIG. 20 is a plan view showing a display panel and a panel mark of the present invention.
Figure 21A:
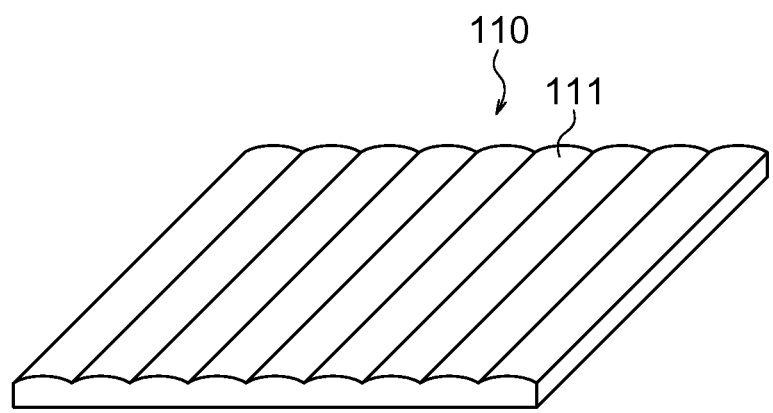
FIG. 21A is a perspective view showing a lenticular lens sheet.
Figure 21B:
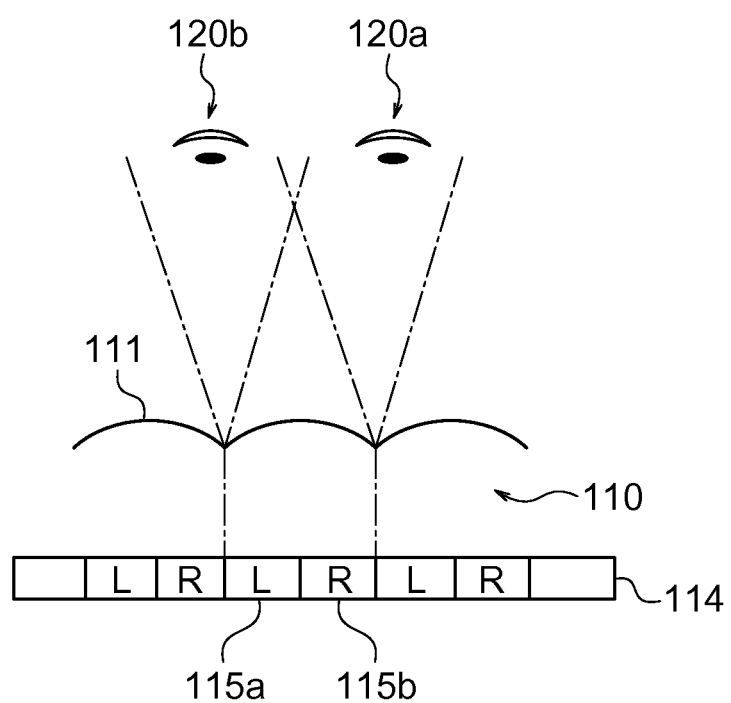
FIG. 21B is a schematic view showing a stereoscopic display method using the lenticular lens sheet.
Figure 22A:
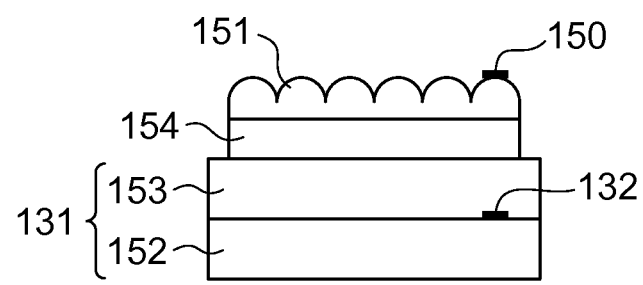
FIG. 22A is a side view showing a liquid crystal display device.
Figure 22B:
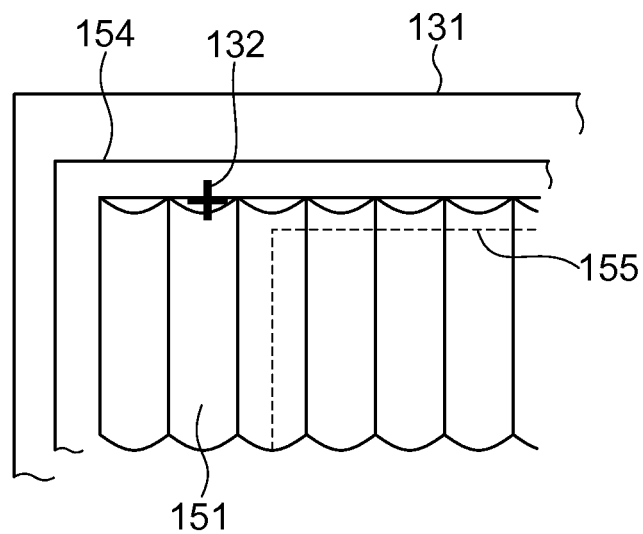
FIG. 22B is a plan view showing the liquid crystal display device.
Figure 23A:
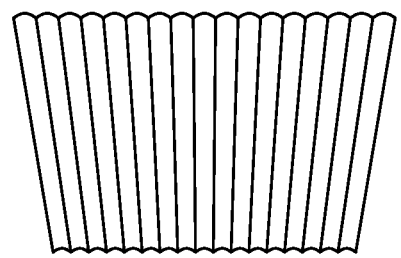
Figure 23B:
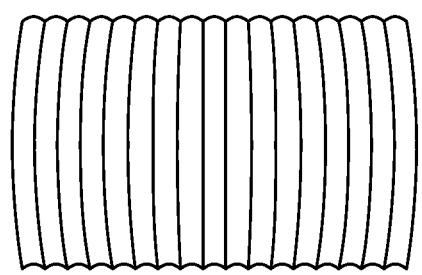
Figure 23C:
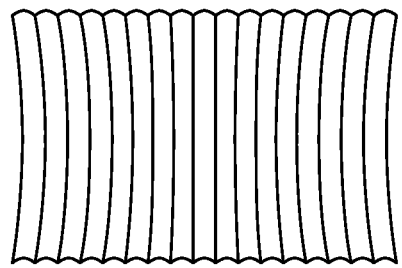

The film laminating method according to the present invention is directed to the display panel that has a panel mark for aligning the position, and the method is characterized to include: a second step which reads a panel mark of the display panel for aligning the position by using a second imaging device; an alignment step which aligns positions of the optical sheet and the display panel according to the first reading step and the second reading step, and moves the sheet holding head to a prescribed position; and a step which laminates the optical sheet and the display panel through relatively moving the sheet holding head and the display panel after bringing the optical sheet to be in contact with the display panel. Through reading the positional information of the optical sheet and the positional information of the display panel by separate devices, there is no restriction set in the positions of the panel mark. For example, in a liquid crystal display device, as shown in FIG. 20, the panel mark 31 can be located in the vicinity of the frame of the display panel 30 distant from the optical sheet 10, so that influences imposed upon the display quality can be reduced.

Next, effects of the present invention will be described. With the present invention, the reading accuracy of the positional information of the optical sheet is improved. Thus, it is possible with the present invention to provide the highly accurate optical sheet laminating step and to improve the yield of the laminating step. Even in a case where the optical element pitch of the optical sheet fluctuates nonuniformly, it is possible to provide the highly accurate optical sheet laminating step and to improve the yield of the laminating step through performing lamination to have the appropriate optical element pitch. Since form of the air bubbles and linear air bubbles between the optical sheet and the display panel can be prevented, the yield of the optical sheet laminating step can be improved. In a case where the lenticular lens sheet is used for the optical sheet, a highly accurate and low load laminating step can be provided through employing a sheet holding manner and a laminating direction by considering the lens pitch direction. Since there is no restriction set in the positions of the panel mark required for highly accurate lamination, the display quality can be improved.

A part or a whole part of the exemplary embodiments can be depicted as follows. However, it is to be noted that the present invention is not limited only to the structures described below.

(Supplementary Note 1)

An optical sheet laminating method which laminates an optical sheet having two sides constituted with an optical element face where a plurality of optical elements are formed and a no-optical-element face where the optical elements are not formed with a display panel where a plurality of electro-optical elements are formed by using a sheet holding head, and the method includes: a first reading step which brings the optical element face to be in contact with the sheet holding head, irradiates light to the contact areas between the optical element face and the sheet holding head from the no-optical-element face, and reads positions of the contact areas by using a first imaging device according to a distribution of reflected light; and an alignment step which aligns positions of the optical sheet and the display panel based on the positions of the contact areas read in the first reading step.

(Supplementary Note 2)

An optical sheet laminating method which laminates an optical sheet having two sides constituted with an optical element face where a plurality of optical elements are formed and a no-optical-element face where the optical elements are not formed with a display panel where a plurality of electro-optical elements are formed by using a sheet holding head, and the method includes: a first reading step which brings the no-optical-element face to be in contact with the sheet holding head, irradiates light to the contact areas between the no-optical-element face and the sheet holding head from the optical element face, and reads positions of the contact areas by using a first imaging device according to a distribution of reflected light; and an alignment step which aligns positions of the optical sheet and the display panel based on the positions of the contact areas read in the first reading step.

(Supplementary Note 3)

An optical sheet laminating method which laminates an optical sheet having two sides constituted with an optical element face where a plurality of optical elements are formed and a no-optical-element face where the optical elements are not formed with a display panel having a panel mark for aligning positions and a plurality of electro-optical elements formed thereon by using a sheet holding head, and the method includes: a first reading step which brings the optical element face to be in contact with the sheet holding head, irradiates light to the contact areas between the optical element face and the sheet holding head from the no-optical-element face, and reads positions of the contact areas through acquiring a distribution of reflected light by using a first imaging device; a second reading step which reads the position of the panel mark by using a second imaging device; an alignment step which aligns positions of the optical sheet and the display panel by moving the sheet holding head to a prescribed position based on the positions of the contact areas read in the first reading step and the position of the panel mark read in the second reading step; and a laminating step which laminates the optical sheet and the display panel through relatively moving the sheet holding head and the display panel while keeping the optical sheet and the display panel in contact.

(Supplementary Note 4)

An optical sheet laminating method which laminates an optical sheet having two sides constituted with an optical element face where a plurality of optical elements are formed and a no-optical-element face where the optical elements are not formed with a display panel having a panel mark for aligning positions and a plurality of electro-optical elements formed thereon by using a sheet holding head, and the method includes: a first reading step which brings the no-optical-element face to be in contact with the sheet holding head, irradiates light to the contact areas between the no-optical-element face and the sheet holding head from the optical element face, and reads positions of the contact areas through acquiring a distribution of reflected light by using a first imaging device; a second reading step which reads the position of the panel mark of the display panel by using a second imaging device; an alignment step which aligns positions of the optical sheet and the display panel by moving the sheet holding head to a prescribed position based on the positions of the contact areas read in the first reading step and the position of the panel mark read in the second reading step; and a laminating step which laminates the optical sheet and the display panel through relatively moving the sheet holding head and the display panel while keeping the optical sheet and the display panel in contact.

(Supplementary Note 5)

The optical sheet laminating method depicted in Supplementary Note 3 or 4, wherein: the optical element is a cylindrical lens formed by a convex lens having a columnar surface; and the optical sheet is a lenticular lens sheet film where a plurality of the cylindrical lenses are arranged at a prescribed lens pitch.

(Supplementary Note 6)

The optical sheet laminating method depicted in Supplementary Note 3 or 4, wherein: the optical element is a fly-eye lens formed by a convex lens having a columnar surface; and the optical sheet is a fly-eye lens film having a lens face where a plurality of the fly-eye lenses are disposed at respective lens pitches in a first direction and a second direction orthogonal to each other.

(Supplementary Note 7)

The optical sheet laminating method depicted in Supplementary Note 5, wherein a surface of the sheet holding head for holding the optical sheet is an arc-shaped (in a prescribed curvature) curved face.

(Supplementary Note 8)

The optical sheet laminating method depicted in Supplementary Note 7, wherein a direction of a tangent of the arc is in parallel to a lens longitudinal direction of the lenticular lens sheet film.

(Supplementary Note 9)

The optical sheet laminating method depicted in Supplementary Note 8, wherein, in the laminating step, a direction of the relative motion is in parallel to the lens longitudinal direction of the lenticular lens sheet film.

(Supplementary Note 10)

The optical sheet laminating method depicted in Supplementary Note 9, wherein, in the laminating step, a pressure applied to the optical sheet when relatively moving the sheet holding head and the display panel is changed in the middle of the relative motion.

(Supplementary Note 11)

The optical sheet laminating method depicted in Supplementary Note 10, wherein, in the laminating step, a shift amount from a designed value of the pitch is found based on the positions of the contact areas read in the first reading step, and the pressure applied to the optical sheet is set in such a manner that the shift amount becomes small.

(Supplementary Note 12)

The optical sheet laminating method depicted in Supplementary Note 11, wherein, in the laminating step, the pressure applied to the optical sheet is set by a push-in amount of the sheet holding head to the display panel.

(Supplementary Note 13)

The optical sheet laminating method depicted in any one of Supplementary Notes 1 to 12, wherein a section where a period of the optical elements is different is provided as a film mark at least on one side of the optical sheet.

(Supplementary Note 14)

The optical sheet laminating method depicted in any one of Supplementary Notes 1 to 12, wherein a section where a period of the optical elements is different is provided as a film mark on both ends of at least one direction of the optical sheet.

(Supplementary Note 15)

The optical sheet laminating method depicted in any one of Supplementary Notes 1 to 12, wherein a notch is provided at least in one of corners of the optical sheet.

(Supplementary Note 16)

The optical sheet laminating method depicted in any one of Supplementary Notes 1 to 15, wherein: at least two or more imaging cameras constituting the first imaging device are provided to acquire at least two or more videos at the time of executing the first reading step; and those videos are used in the alignment step.

(Supplementary Note 17)

The optical sheet laminating method depicted in any one of Supplementary Notes 1 to 16, wherein the sheet holding head holds the optical sheet over a whole region including the contact areas used in the first reading step.

(Supplementary Note 18)

The optical sheet laminating method depicted in any one of Supplementary Notes 1 to 17, wherein: a surface of the sheet holding head is covered by adhesive elastomer; and the optical sheet is held by using an adhesive power of the elastomer.

(Supplementary Note 19)

The optical sheet laminating method depicted in any one of Supplementary Notes 1 to 18, wherein the display panel is a liquid crystal display panel.

(Supplementary Note 20)

An optical sheet laminating device which uses the optical sheet laminating method depicted in any one of Supplementary Notes 1 to 19.

(Supplementary Note 21)

A display device which is manufactured by the optical sheet laminating method depicted in any one of Supplementary Notes 1 to 19.

(Supplementary Note 22)

An optical sheet laminating method which laminates an optical sheet having two sides constituted with an optical element face where a plurality of optical elements are formed and a no-optical-element face where the optical elements are not formed with a display panel by using a sheet holding head, and the method includes: bringing either the optical element face or the no-optical-element face to be in contact with the sheet holding head; irradiating light to contact areas between either the optical element face or the non-optical and the sheet holding head from the other one of the optical element face and the no-optical-element face; reading positional information of the contact areas from a distribution of reflected light thereof; and aligning positions of the optical sheet and the display panel based on the positional information of the contact areas, and laminating the optical sheet and the display panel.

(Supplementary Note 23)

The optical sheet laminating method depicted in Supplementary Note 22, which includes: reading positional information of a panel mark added to the display panel; aligning positions of the optical sheet and the display panel based on the positional information of the contact areas and the positional information of the panel mark; and laminating the optical sheet and the display panel through relatively moving the sheet holding head and the display panel while keeping the optical sheet and the display panel in contact.

(Supplementary Note 24)

The optical sheet laminating method depicted in Supplementary Note 22 or 23, wherein: the optical element is a cylindrical lens formed by a convex lens having a columnar surface; and the optical sheet is a lenticular lens sheet film where a plurality of the cylindrical lenses are arranged at a prescribed lens pitch.

(Supplementary Note 25)

The optical sheet laminating method depicted in Supplementary Note 22 or 23, wherein: the optical element is a fly-eye lens formed by a convex lens having a columnar surface; and the optical sheet is a fly-eye lens film having a lens face where a plurality of the fly-eye lenses are disposed at respective lens pitches in a first direction and a second direction orthogonal to each other.

(Supplementary Note 26)

The optical sheet laminating method depicted in Supplementary Note 24, wherein a surface of the sheet holding head for holding the optical sheet is an arc-shaped curved face.

(Supplementary Note 27)

The optical sheet laminating method depicted in Supplementary Note 26, wherein a direction of a tangent of the arc is in parallel to a lens longitudinal direction of the lenticular lens sheet film.

(Supplementary Note 28)

The optical sheet laminating method depicted in Supplementary Note 27, wherein a direction of the relative motion is in parallel to the lens longitudinal direction of the lenticular lens sheet film.

(Supplementary Note 29)

The optical sheet laminating method depicted in Supplementary Note 28, which includes changing a pressure applied to the optical sheet when relatively moving the sheet holding head and the display panel in a middle of the relative motion.

(Supplementary Note 30)

The optical sheet laminating method depicted in Supplementary Note 29, which includes: acquiring a shift amount from a designed value of the pitch based on the positional information of the contact areas; and setting the pressure applied to the optical sheet in such a manner that the shift amount becomes small.

(Supplementary Note 31)

The optical sheet laminating method depicted in Supplementary Note 30, wherein the pressure applied to the optical sheet is set by a push-in amount of the sheet holding head to the display panel.

(Supplementary Note 32)

The optical sheet laminating method depicted in any one of Supplementary Notes 24 to 31, wherein a section where a period of the optical elements is different is provided at least on one side of the optical sheet.

(Supplementary Note 33)

The optical sheet laminating method depicted in any one of Supplementary Notes 22 to 31, wherein a section where a period of the optical elements is different is provided on both ends of at least one direction of the optical sheet.

(Supplementary Note 34)

The optical sheet laminating method depicted in any one of Supplementary Notes 22 to 31, wherein a notch is provided at least in one of corners of the optical sheet.

(Supplementary Note 35)

The optical sheet laminating method depicted in any one of Supplementary Notes 22 to 34, wherein a plurality of images of the distribution of the reflected light are acquired by a plurality of cameras to read positional information of the contact areas.

(Supplementary Note 36)

The optical sheet laminating method depicted in any one of Supplementary Notes 22 to 35, wherein the sheet holding head holds the optical sheet over a whole region including the contact areas.

(Supplementary Note 37)

The optical sheet laminating method depicted in any one of Supplementary Notes 22 to 36, wherein: a surface of the sheet holding head is covered by adhesive elastomer; and the optical sheet is held by using an adhesive power of the elastomer.

(Supplementary Note 38)

The optical sheet laminating method depicted in any one of Supplementary Notes 22 to 37, wherein the display panel is a liquid crystal display panel.

(Supplementary Note 39)

An optical sheet laminating device which laminates an optical sheet having two sides constituted with an optical element face where a plurality of optical elements are formed and a no-optical-element face where the optical elements are not formed with a display panel, and the device includes: a sheet holding head which holds the optical sheet by making contact with either the optical element face or the no-optical-element face; a first imaging part which irradiates light to contact areas between either the optical element face or the non-optical and the sheet holding head from the other one of the optical element face or the no-optical-element face, and acquires an image of a distribution of reflected light thereof; a second imaging part which acquires an image of a panel mark added to the display panel; a moving mechanism unit which moves at least either the optical sheet or the display panel in a coordinate space; and a control unit which reads positional information of the contact areas from the image acquired by the first imaging part and positional information of the panel mark from the image acquired by the second imaging part and controls the moving mechanism unit based on the positional information of the contact areas and the positional information of the panel mark to align the positions of the optical sheet and the display panel and to laminate the optical sheet and the display panel.

(Supplementary Note 40)

A display device which includes the display panel to which the optical sheet is laminated by the optical sheet laminating method depicted in any one of Supplementary Notes 22 to 38.

(Supplementary Note 41)

A program used in an optical sheet laminating device which laminates an optical sheet having two sides constituted with an optical element face where a plurality of optical elements are formed and a no-optical-element face where the optical elements are not formed with a display panel, the device including: a sheet holding head which holds the optical sheet by making contact with either the optical element face or the no-optical-element face; a first imaging part which irradiates light to the contact areas between either the optical element face or the non-optical and the sheet holding head from the other one of the optical element face or the no-optical-element face, and acquires an image of a distribution of reflected light thereof; a second imaging part which acquires an image of a panel mark added to the display panel; a moving mechanism unit which moves at least either the optical sheet or the display panel in a coordinate space; and a control unit including a computer. The program causes the computer to execute: a procedure for reading positional information of the contact areas from the image acquired by the first imaging part; a procedure for reading positional information of the panel mark from the image acquired by the second imaging part; and a procedure for aligning the positions of the optical sheet and the display panel and laminating the optical sheet and the display panel by controlling the moving mechanism unit based on the positional information of the contact areas and the positional information of the panel mark.

INDUSTRIAL APPLICABILITY

The present invention can be used for a display device that is capable of stereoscopic image display, a viewing angle control, and the like, for example, and for a manufacturing method thereof.

What is claimed is:

1. An optical sheet laminating method which laminates an optical sheet having two sides constituted by an optical element face where a plurality of optical elements are formed and a no-optical-element face where the optical elements are not formed with a display panel by using a sheet holding head, the method comprising:
  bringing either the optical element face or the no-optical-element face into contact with the sheet holding head;
  irradiating light to contact areas between either the optical element face or the no-optical-element face and the sheet holding head from the other of the optical element face and the no-optical-element face;
  reading positional information of the contact areas from a distribution of reflected light thereof;
  aligning positions of the optical sheet and the display panel based on the positional information of the contact areas, and laminating the optical sheet and the display panel; and
  acquiring a shift amount from a designed value of the pitch based on the positional information of the contact areas and setting the pressure applied to the optical sheet in such a manner that the shift amount becomes small, wherein:
  the optical element is a cylindrical lens formed by a convex lens having a columnar surface, and the optical sheet is a lenticular lens sheet film where a plurality of the cylindrical lenses are arranged at a prescribed lens pitch.

2. The optical sheet laminating method as claimed in claim 1, comprising:
reading positional information of a panel mark added to the display panel;
aligning positions of the optical sheet and the display panel based on the positional information of the contact areas and the positional information of the panel mark; and
laminating the optical sheet and the display panel through relatively moving the sheet holding head and the display panel while keeping the optical sheet and the display panel in contact.

3. An optical sheet laminating method which laminates an optical sheet having two sides constituted by an optical element face where a plurality of optical elements are formed and a no-optical-element face where the optical elements are not formed with a display panel by using a sheet holding head, the method comprising:
bringing either the optical element face or the no-optical-element face into contact with the sheet holding head;
irradiating light to contact areas between either the optical element face or the no-optical-element face and the sheet holding head from the other of the optical element face and the no-optical-element face;
reading positional information of the contact areas from a distribution of reflected light thereof;
aligning positions of the optical sheet and the display panel based on the positional information of the contact areas, and laminating the optical sheet and the display panel; and
acquiring a shift amount from a designed value of the pitch based on the positional information of the contact areas and setting the pressure applied to the optical sheet in such a manner that the shift amount becomes small, wherein:
the optical element is a fly-eye lens formed by a convex lens having a columnar surface; and
the optical sheet is a fly-eye lens film having a lens face where a plurality of the fly-eye lenses are disposed at respective lens pitches in a first direction and a second direction orthogonal to each other.

4. The optical sheet laminating method as claimed in claim 1, wherein
a surface of the sheet holding head for holding the optical sheet is an arc-shaped curved face.

5. The optical sheet laminating method as claimed in claim 4, wherein
a direction of a tangent of the arc is in parallel to a lens longitudinal direction of the lenticular lens sheet film.

6. The optical sheet laminating method as claimed in claim 5, wherein
a direction of relative motion is in parallel to the lens longitudinal direction of the lenticular lens sheet film.

7. The optical sheet laminating method as claimed in claim 6, comprising
changing a pressure applied to the optical sheet when relatively moving the sheet holding head and the display panel in a middle of the relative motion.

8. The optical sheet laminating method according to claim 1, wherein
the contact areas are portions where light is strongly reflected in a linear fashion, due to the contact between either the optical element face or the no-optical-element face and the sheet holding head.

9. The optical sheet laminating method as claimed in claim 1, wherein
the pressure applied to the optical sheet is set by a push-in amount of the sheet holding head to the display panel.

10. The optical sheet laminating method as claimed in claim 1, wherein
a section where a period of the optical elements is different is provided at least on one side of the optical sheet.

11. The optical sheet laminating method as claimed in claim 1, wherein
a section where a period of the optical elements is different is provided on both ends of at least one direction of the optical sheet.

12. The optical sheet laminating method as claimed in claim 1, wherein
a notch is provided at least in one of corners of the optical sheet.

13. The optical sheet laminating method as claimed in claim 1, wherein
a plurality of images of the distribution of the reflected light are acquired by a plurality of cameras to read positional information of the contact areas.

14. The optical sheet laminating method as claimed in claim 1, wherein
the sheet holding head holds the optical sheet over a whole region including the contact areas.

15. The optical sheet laminating method as claimed in claim 1, wherein:
a surface of the sheet holding head is covered by adhesive elastomer; and the optical sheet is held by using an adhesive power of the elastomer.

16. The optical sheet laminating method as claimed in claim 1, wherein
the display panel is a liquid crystal display panel.

17. The optical sheet laminating method according to claim 3, wherein
the contact areas are portions where light is strongly reflected in a linear fashion, due to the contact between either the optical element face or the no-optical-element face and the sheet holding head.

18. The optical sheet laminating method as claimed in claim 3, comprising:
reading positional information of a panel mark added to the display panel;
aligning positions of the optical sheet and the display panel based on the positional information of the contact areas and the positional information of the panel mark; and
laminating the optical sheet and the display panel through relatively moving the sheet holding head and the display panel while keeping the optical sheet and the display panel in contact.

19. The optical sheet laminating method as claimed in claim 3, wherein
a surface of the sheet holding head for holding the optical sheet is an arc-shaped curved face.

20. The optical sheet laminating method as claimed in claim 3, wherein
a section where a period of the optical elements is different is provided at least on one side of the optical sheet.

* * * * *